US006800123B2

(12) United States Patent
Arakawa

(10) Patent No.: US 6,800,123 B2
(45) Date of Patent: Oct. 5, 2004

(54) INK-JET INK, METHOD OF MANUFACTURING THE SAME, AND INK JET RECORDING METHOD

(75) Inventor: Jun Arakawa, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 88 days.

(21) Appl. No.: 09/800,778

(22) Filed: Mar. 8, 2001

(65) Prior Publication Data

US 2002/0007762 A1 Jan. 24, 2002

(30) Foreign Application Priority Data

Mar. 21, 2000 (JP) ........................................ 2000-078454

(51) Int. Cl.$^7$ .............................................. C09D 11/02
(52) U.S. Cl. ................................ 106/31.25; 106/31.27; 106/31.43; 106/31.47; 106/31.49; 106/31.58
(58) Field of Search ......................... 106/31.25, 31.27, 106/31.43, 31.47, 31.49, 31.58; 347/100

(56) References Cited

U.S. PATENT DOCUMENTS

| 2,322,027 | A | * | 6/1943 | Jelley et al. ................. 430/546 |
| 4,246,154 | A | | 1/1981 | Yao |
| 4,409,039 | A | * | 10/1983 | Lepesant et al. ......... 106/31.25 |
| 4,597,794 | A | | 7/1986 | Ohta et al. |
| 4,665,411 | A | | 5/1987 | Kiritani et al. |
| 5,227,359 | A | | 7/1993 | Mikoshiba et al. |
| 5,344,933 | A | | 9/1994 | Mikoshiba et al. |
| 5,753,017 | A | * | 5/1998 | Onodera et al. ......... 106/31.49 |
| 5,837,753 | A | | 11/1998 | Caputo |
| 6,020,400 | A | | 2/2000 | Anton et al. |
| 6,031,019 | A | | 2/2000 | Tsutsumi et al. |
| 6,344,497 | B1 | | 2/2002 | Meyrick et al. |
| 6,383,276 | B1 | * | 5/2002 | Yamakawa et al. ...... 106/31.49 |
| 2001/0045176 | A1 | * | 11/2001 | Kimura et al. ........... 106/31.47 |
| 2002/0017217 | A1 | * | 2/2002 | Mizukawa et al. ...... 106/31.47 |
| 2002/0067399 | A1 | | 6/2002 | Yabuki et al. |
| 2002/0112641 | A1 | * | 8/2002 | Naruse et al. ........... 106/31.27 |

FOREIGN PATENT DOCUMENTS

| EP | 1 035 172 A2 | 9/2000 |
| JP | 56-157468 | 12/1981 |
| JP | 58-45272 | 3/1983 |
| JP | 62-207375 A | 11/1987 |
| JP | 01-170674 A | 5/1989 |
| JP | 03-103484 A | 4/1991 |
| JP | 4-18468 | 1/1992 |
| JP | 04-039365 A | 2/1992 |
| JP | 5-76977 | 10/1993 |
| JP | 06-340835 A | 12/1994 |
| JP | 07-268254 A | 10/1995 |
| JP | 07-268257 A | 10/1995 |
| JP | 07-268260 A | 10/1995 |
| JP | 08-286340 A | 1/1996 |
| JP | 08-183920 A | 7/1996 |
| JP | 08-269374 A | 10/1996 |
| JP | 10-110126 | 4/1998 |
| JP | 10-195355 | 7/1998 |
| JP | 10-279873 | 10/1998 |
| JP | 11-286637 A | 10/1999 |
| JP | 2000-303009 A | 10/2000 |
| JP | 2000-327939 A | 11/2000 |

OTHER PUBLICATIONS

English translation of JP01/170674, Jul. 1989.*
English translation of JP62/207375, Sep. 1987.*
Derwent abstract of JP01/117064, Jul. 1989.*
Copy of corresponding European Search Report in European Application No. 01 10 6957 mailed on Sep. 19, 2003.
Derwent Abstract No. XP–002253061, Japanese Appln. No. 08 176482A, dated Jul. 9, 1996.
Derwent Abstract No. XP–002253062, Japanese Appln. No. 07 133454A, dated May 23, 1995.
Derwent Abstract No. XP–002253063, Japanese Appln. No. 07 305010A, dated Nov. 21, 1995.
Derwent Abstract No. XP–002253064, Japanese Appln. No. 07 305007A, dated Nov. 21, 1995.
Derwent Abstract No. XP–002253066, Japanese Appln. No. 62 045675A, dated Feb. 27, 1987.
Derwent Abstract No. XP–002253068, Japanese Appln. No. 61 053374A, dated Mar. 17, 1986.
Derwent Abstract No. XP–002253082, Japanese Appln. No. 05 255604A, dated Oct. 5, 1993.
Derwent Abstract No. XP–002253069, Japanese Appln. No. 61 053373A, dated Mar. 17, 1986.
Derwent Abstract No. XP–002253070, Japanese Appln. No. 61 053372A, dated Mar. 17, 1986.
Derwent Abstract No. XP–002253083, Japanese Appln. No. 03 231975A, dated Oct. 15, 1991.
Derwent Abstract No. XP–002253071, Japanese Appln. No. 62 041275, dated Feb. 23, 1987.
Derwent Abstract No. XP–002253072, Japanese Appln. No. 59 168076A, dated Sep. 21, 1984.
Derwent Abstract No. XP–002253073, Japanese Appln. No. 10 158553A, dated Jun. 16, 1998.

* cited by examiner

Primary Examiner—Helene Klemanski
(74) Attorney, Agent, or Firm—Burns, Doane, Swecker & Mathis, L.L.P.

(57) ABSTRACT

An ink-jet ink which comprises a dye dispersed product, an oil-soluble dye being dissolved in a high boiling point organic solvent which has a boiling point of 150° C. or more and has a specific inductive capacity at 25° C. of 3 to 12, the oil-soluble dye is emulsified and dispersed in a water-based medium, and the dye dispersed product is formed. Further, a method of manufacturing an ink-jet ink, in which an oil-soluble dye is dissolved in a high boiling point organic solvent which has a boiling point of 150° C. or more and has a specific inductive capacity at 25° C. of 3 to 12, and the oil soluble dye is emulsified and dispersed at a pressure of 50 MPa or more using a high-pressure emulsifying and dispersing device.

16 Claims, No Drawings

INK-JET INK, METHOD OF MANUFACTURING THE SAME, AND INK JET RECORDING METHOD

BACKGROUND OF THE INVENTION

1. Field of the Invention

The present invention relates to an ink-jet ink which improves the quality of a recorded image and has an excellent discharge stability, a method of manufacturing the same, and an ink jet recording method using the ink-jet ink.

2. Description of the Related Art

As computers have spread in recent years, ink jet printers have been widely used for recording on paper, film, cloth and the like not only in offices but also in homes. As ink jet recording inks, oil-soluble inks, water-based inks and solid inks are known. Of these inks, water-based inks are advantageous in view of ease of production and handling, smell, safety and so on. Thus, water-based inks are mainly used.

The reason why water-soluble inks in water-based inks are used is that a water-soluble ink has advantages of ease of production of the ink, superior preservation stability, good color hue and high color density. However, water-soluble dye has poor water resistance, so that bleeding is caused if recording is carried out with the ink on plain paper. As a result, problems that recording quality deteriorates remarkably and light resistance is poor arise.

Thus, for example, Japanese Patent Application Laid-Open (JP-A) No. 56-157468, JP-A No. 4-18468, JP-A No. 10-110126 and JP-A No. 10-195355 suggest water-based inks containing a pigment or a dispersed dye in order to solve the above-mentioned problems.

The water resistance of these water-based inks is improved to some extent. However, it is difficult to say that water resistance is sufficient, and the following problems arise: a dispersant of the pigment or the dispersed dye in the water-based ink has insufficient preservation stability, such that an ink jet opening is easily blocked with the water-based ink.

In contrast, JP-A No. 58-45272 discloses a method of including a dye in urethane polymer latex particles.

However, in this case, there are drawbacks in that color reproduction is not sufficient because of insufficient color tones and that, when a dye is included at a desirable density, dispersion stability or water tolerance of a dye-including polymer dispersed product is not necessarily satisfactory.

On the other hand, JP-A-10-279873 discloses a method in which an acrylic polymer and an oil-soluble dye are dissolved and dispersed in an organic solvent, and then the organic solvent is removed, and thereby colored polymer particulates are manufactured.

However, in this case, there is a drawback in that the quality of a recorded image, in particular, the quality of an image when the image is recorded onto a paper medium for a photographic image quality, or stability in continuous recording is not sufficient.

Further, Japanese Patent Application Publication (JP-B) No. 5-76977 discloses an ink composition in which an oil-soluble dye is dissolved and dispersed in an organic solvent whose solubility to water is small and whose specific gravity is close to water.

However, the phase solubility of the organic solvent which is defined in JP-B-5-76977 with the above-described oil-soluble dye is unsatisfactory in general. Accordingly, there are drawbacks in that a recording density is low, that, in some case, the dye deposits during the storage, and that a nozzle may be clogged.

SUMMARY OF THE INVENTION

An object of the present invention is to provide an ink-jet ink: which can record suitably as a water-based ink for writing, a water-based printing ink, an ink for information recording, or the like by a thermal, piezoelectric, electric field, or acoustic ink jet type; in which a dye does not deposit, in which, when printing or the like is carried out using a nozzle or the like, the distal end of the nozzle is not clogged and discharge stability is excellent; which has excellent handling ability, odor ability, safety; which has no paper dependence; which has excellent permeability at the time of recording; in which stains are not generated immediately after the recording; which has excellent color formation efficiency/color tone, water tolerance, light resistance; and in which an image having a high density and a high quality can be recorded. Further, an object of the present invention is to provide a method of manufacturing the ink-jet ink and an ink jet recording method using the ink-jet ink.

The object described above can be achieved by the following means:

A first aspect of the present invention is an ink-jet ink which comprises a dye dispersed product, an oil-soluble dye being dissolved in a high boiling point organic solvent which has a boiling point of 150° C. or more and has a specific inductive capacity at 25° C. of 3 to 12, said oil-soluble dye being emulsified and dispersed in a water-based medium, and said dye dispersed product being formed.

A second aspect of the present invention is a method of manufacturing an ink-jet ink, in which an oil-soluble dye is dissolved in a high boiling point organic solvent which has a boiling point of 150° C. or more and has a specific inductive capacity at 25° C. of 3 to 12, and said oil soluble dye being emulsified and dispersed at a pressure of 50 MPa (500 bar) or more using a high-pressure emulsifying and dispersing device.

A third aspect of the present invention is an ink jet recording method in which recording is carried out onto an image receiving material using an ink-jet ink which includes a dye dispersed product, an oil-soluble dye being dissolved in a high boiling point organic solvent which has a boiling point of 150° C. or more and has a specific inductive capacity at 25° C. of 3 to 12, the oil-soluble dye being emulsified and dispersed in a water-based medium, and the dye dispersed product being formed.

DESCRIPTION OF THE PREFERRED EMBODIMENTS

Description will be given hereinafter of an ink-jet ink, a method of manufacturing the same, and an ink jet recording method of the present invention.

[Ink-jet Ink and Method of Manufacturing the Same]

An ink-jet ink of the present invention includes a dye dispersed product.

In the above-described dye dispersed product, an oil-soluble dye, which was dissolved in a high boiling point organic solvent, is emulsified and dispersed in a water-based medium. The dye dispersed product contains dispersed particles. Namely, in the above dye dispersed product, the above-described high boiling point organic solvent, into which the above oil-soluble dye was dissolved, is emulsified and dispersed in the above water-based medium as particulate-shaped oil drops (the above dispersed particles).

In a method of manufacturing the ink-jet ink of the present invention, the oil-soluble dye, which was dissolved in the high boiling point organic solvent, is emulsified and dispersed at a pressure of 50 MPa (500 bar) or more using a high-pressure emulsifying and dispersing device.

Oil-Soluble Dye

The above oil-soluble dye includes a yellow dye, a magenta dye, a cyan dye, or the like. A dye having any solubility to water can be used.

The above-described yellow dye is not particularly limited and can be selected arbitrarily from known dyes. The yellow dye includes, for example, an aryl or heteryl azo dye which has phenols, naphthols, anilines, pyrazolones, pyridones, opened type active methylene compounds as a coupling component; an azomethine dye which has opened type active methylene compounds as a coupling component; a methine dye such as a benzylidene dye, a monomethineoxonol dye, or the like; a quinone dye such as a naphthoquinone dye, an anthraquinone dye, or the like; a quinophthalone dye; a nitro/nitroso dye; an acridine dye; an acridinone dye; or the like.

These yellow dyes may present yellow only after a portion of chromophore dissociates. At that time, a counter cation may be an inorganic cation such as an alkali metal or ammonium, an organic cation such as pyridinium or quaternary ammonium salt, and further, a polymer cation which has these cations at a partial structure.

The above magenta dye is not particularly limited and can be selected arbitrarily from known dyes. The magenta dye includes, for example, an aryl or heteryl azo dye which has phenols, naphthols, anilines as a coupling component; an azomethine dye which has pyrazolones, pyrazolotriazoles as a coupling component; a methine dye such as an arylidene dye, a styryl dye, a merocyanine dye, an oxonol dye, or the like; a carbonium dye such as a diphenylmethane dye, a triphenylmethane dye, a xanthene dye, or the like; a quinone dye such as naphthoquinone, anthraquinone, anthrapyridone, or the like; a condensed polycyclic dye such as a dioxadine dye or the like.

These magenta dyes may present magenta only after a portion of chromophore dissociates. At that time, a counter cation may be an inorganic cation such as an alkali metal or ammonium, an organic cation such as pyridinium or quaternary ammonium salt, and further, a polymer cation which has these cations at a partial structure.

The above cyan dye is not particularly limited and can be selected arbitrarily from known dyes. The cyan dye includes, for example, an azomethine dye such as an indoaniline dye, an indophenol dye, or the like; a polymethine dye such as a cyanine dye, an oxonol dye, a merocyanine dye, or the like; a carbonium dye such as a diphenylmethane dye, a triphenylmethane dye, a xanthene dye, or the like; a phthalocyanine dye; an anthraquinone dye; an aryl or heteryl azo dye which has phenols, naphthols, anilines as a coupling component; an indigo/thioindigo dye; or the like.

These cyan dyes may present cyan only after a portion of chromophore dissociates. At that time, a counter cation may be an inorganic cation such as an alkali metal or ammonium, an organic cation such as pyridinium or quaternary ammonium salt, and further, a polymer cation which has these cations at a partial structure.

Among the above oil-soluble dyes, a dye which is used for a color photographic material and is generated from a developing agent and a coupler due to oxidation is preferable. Above all, a dye which is represented in the following formula (I) is preferable.

The dye which is represented in the formula (I) will be described hereinafter. It is preferable to have a compound in which at least one of groups in the following formula (I) is within preferable ranges shown below. It is more preferable to have a compound in which more groups are within the preferable ranges. It is most preferable to have a compound in which all groups are within the preferable ranges.

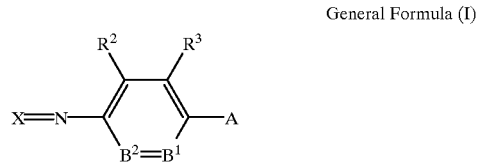

General Formula (I)

In the above formula (I), X represents the residue of a color coupler.

A represents —$NR^4R^5$ or a hydroxyl group, and represents preferably —$NR^4R^5$. $R^4$ and $R^5$ represent respectively independently a hydrogen atom, an aliphatic group, an aromatic group, or a heterocyclic group. It is preferable that $R^4$ and $R^5$ represent a hydrogen atom or an aliphatic group. It is more preferable that $R^4$ and $R^5$ represent a hydrogen atom, an alkyl group, or a substituted alkyl group, and is most preferable that $R^4$ and $R^5$ represent a hydrogen atom, an alkyl group having 1 to 18 carbon atoms, or a substituted alkyl group having 1 to 18 carbon atoms.

$B^1$ represents =$C(R^6)$— or =N—.
$B^2$ represents —$C(R^7)$= or —N=.
It is preferable that $B^1$ and $B^2$ are not —N= simultaneously, and is more preferable that $B^1$ is =$C(R^6)$— and $B^2$ is —$C(R^7)$=.

$R^2$, $R^3$, $R^6$, and $R^7$ represent respectively independently a hydrogen atom, a halogen atom, an aliphatic group, an aromatic group, a heterocyclic group, a cyano group, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$, or —$NR^{70}SO_2R^{71}$. $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$, and $R^{71}$ represent respectively independently a hydrogen atom, an aliphatic group, or an aromatic group.

Among the aforementioned, it is preferable that $R^2$ and $R^7$ represent respectively independently a hydrogen atom, a halogen atom, an aliphatic group, —$OR^{51}$, —$NR^{62}CONR^{63}R^{64}$, —$NR^{65}CO_2R^{66}$, —$NR^{68}COR^{69}$, or —$NR^{70}SO_2R^{71}$. It is more preferable that $R^2$ and $R^7$ represent a hydrogen atom, a fluorine atom, a chlorine atom, an alkyl group, a substituted alkyl group, —$NR^{62}CONR^{63}R^{64}$, or —$NR^{68}COR^{69}$. It is furthermore preferable that $R^2$ and $R^7$ represent a hydrogen atom, a chlorine atom, an alkyl group having 1 to 10 carbon atoms, or a substituted alkyl group having 1 to 10 carbon atoms. It is most preferable that $R^2$ and $R^7$ represent a hydrogen atom, an alkyl group having 1 to 4 carbon atoms, or a substituted alkyl group having 1 to 4 carbon atoms.

Among the aforementioned, it is preferable that $R^3$ and $R^6$ represent respectively independently a hydrogen atom, a halogen atom, or an aliphatic group. It is more preferable that $R^3$ and $R^6$ represent a hydrogen atom, a fluorine atom, a chlorine atom, an alkyl group, or a substituted alkyl group. It is furthermore preferable that $R^3$ and $R^6$ represent a hydrogen atom, a chlorine atom, an alkyl group having 1 to 10 carbon atoms, or a substituted alkyl group having 1 to 10 carbon atoms. It is most preferable that $R^3$ and $R^6$ represent a hydrogen atom, an alkyl group having 1 to 4 carbon atoms, or a substituted alkyl group having 1 to 4 carbon atoms.

In the above formula (I), $R^2$ and $R^3$, $R^3$ and $R^4$, $R^4$ and $R^5$, $R^5$ and $R^6$, or $R^6$ and $R^7$ may be combined with each other and form a ring. The preferable ring forming combination is $R^3$ and $R^4$, $R^4$ and $R^5$, or $R^5$ and $R^6$.

It is preferable that the ring, in which $R^2$ and $R^3$ are combined with each other and form, or the ring, in which $R^6$ and $R^7$ are combined with each other and form, is a five-membered ring or a six-membered ring. The ring is preferably an aromatic ring (a benzene ring or the like) or an unsaturated heterocyclic ring (a pyridine ring, an imidazole ring, a thiazole ring, a pyrimidine ring, a pyrrole ring, a furan ring, or the like).

It is preferable that the ring, in which $R^3$ and $R^4$ are combined with each other and form, or the ring, in which $R^5$ and $R^6$ are combined with each other and form, is a five-membered ring or a six-membered ring. The ring is preferably a tetrahydroquinoline ring or a dihydroindole ring.

It is preferable that the ring, in which $R^4$ and $R^5$ are combined with each other and form, is a five-membered ring or a six-membered ring. The ring is preferably a pyrrolidine ring, a piperidine ring, or a morpholine ring.

The above aliphatic group includes an alkyl group, a substituted alkyl group, an alkenyl group, a substituted alkenyl group, an alkynyl group, a substituted alkynyl group, an aralkyl group, and a substituted aralkyl group.

The above-described alkyl group may form a branched shape or a ring shape. The alkyl group has preferably 1 to 20 carbon atoms, and has more preferably 1 to 18 carbon atoms. An alkyl portion of the above substituted alkyl group is the same as the above-described alkyl group.

The above alkenyl group may form a branched shape or a ring shape. The alkenyl group has preferably 2 to 20 carbon atoms, and has more preferably 2 to 18 carbon atoms. An alkenyl portion of the above substituted alkenyl group is the same as the above-described alkenyl group.

The above alkynyl group may form a branched shape or a ring shape. The alkynyl group has preferably 2 to 20 carbon atoms, and has more preferably 2 to 18 carbon atoms. An alkynyl portion of the above substituted alkynyl group is the same as the above-described alkynyl group.

An alkyl portion of the above aralkyl group and the above substituted aralkyl group are the same as the above alkyl group. An aryl portion of the above aralkyl group and the above substituted aralkyl group are the same as the aryl group below.

The substituents of the above substituted alkyl group, the above substituted alkenyl group, the above substituted alkynyl group, and the above substituted aralkyl group include, for example, a halogen atom, a cyano group, a nitro group, a heterocyclic group, $-OR^{111}$, $-SR^{112}$, $-CO_2NR^{113}$, $-NR^{114}R^{115}$, $-CONR^{116}R^{117}$, $-SO_2R^{118}$, and $-SO_2NR^{119}R^{120}$. $R^{111}$, $R^{112}$, $R^{113}$, $R^{114}$, $R^{115}$, $R^{116}$, $R^{117}$, $R^{118}$, $R^{119}$, and $R^{120}$ represent respectively independently a hydrogen atom, an aliphatic group, or an aromatic group.

The substituents of the above substituted aralkyl group are the same as the following examples of substituents of the substituted aryl group.

The above aromatic group means an aryl group and a substituted aryl group.

The above-described aryl group is preferably a phenyl group or a naphthyl group, and is more preferably a phenyl group.

An aryl portion of the above substituted aryl group is the same as the above-described aryl group.

The substituents of the above substituted aryl group include, for example, a halogen atom, a cyano group, a nitro group, an aliphatic group, a heterocyclic group, $-OR^{121}$, $-SR^{122}$, $-CO_2R^{123}$, $-NR^{124}R^{125}$, $-CONR^{126}R^{127}$, $-SO_2R^{128}$, and $-SO_2NR^{129}R^{130}$. $R^{121}$, $R^{122}$, $R^{123}$, $R^{124}$, $R^{125}$, $R^{126}$, $R^{127}$, $R^{128}$, $R^{129}$, and $R^{130}$ represent respectively independently a hydrogen atom, an aliphatic group, or an aromatic group.

The above heterocyclic group includes a group having a saturated heterocyclic ring or a group having an unsaturated heterocyclic ring.

The heterocyclic ring in the above heterocyclic group is preferably a five-membered ring or a six-membered ring. Moreover, an aliphatic ring, an aromatic ring, or another heterocyclic ring may be condensed into the heterocyclic ring. Examples of a hetero atom in the heterocyclic ring include B, N, O, S, Se, and Te. Among them, N, O, and S are preferable as the hetero atom. Among the atoms which form the heterocylic ring, a heterocyclic group having a valence (univalent) in which a carbon atom is free (the heterocylic group combines in the carbon atom) is preferable.

The above saturated heterocyclic ring include, for example, a pyrrolidine ring, a morpholine ring, a 2-bora-1, 3-dioxolan ring, and a 1,3-thiazolizin ring.

The above unsaturated ring include, for example, an imidazole ring, a thiazole ring, a benzothiazole ring, a benzooxazole ring, a benzotriazole ring, a benzoselenazole ring, a pyridine ring, a pyrimidine ring, and a quinoline ring.

The above-described heterocyclic ring may have a substituent. Examples of the substituent include a halogen atom, a cyano group, a nitro group, an aliphatic group, an aromatic group, a heterocyclic group, $-OR^{131}$, $-SR^{132}$, $-CO_2R^{133}$, $-NR^{134}R^{135}$, $-CONR^{136}R^{137}$, $-SO_2R^{138}$, and $-SO_2NR^{139}R^{140}$. $R^{131}$, $R^{132}$, $R^{133}$, $R^{134}$, $R^{135}$, $R^{136}$, $R^{137}$, $R^{138}$, $R^{139}$, and $R^{140}$ represent respectively independently a hydrogen atom, an aliphatic group, or an aromatic group.

In the above formula (I), X represents the residue of the color coupler.

The dye which is represented in the above formula (I) is generated due to the reaction of the oxidant of the developing agent and the coupler. X represents a group which is derived from the coupler. The coupler herein is a compound which can coupling-react with the oxidant of a color developing agent. More concrete descriptions are given in "3.6 Coupler and Related Materials" (pages 204 to 222) of "Shashin Kogaku no Kiso—Ginen Shashin hen (Elements of Photographic Engineering—Silver Photograph volume) edited by The Society of Photographic Science and Technology of Japan (1979, published by Koronasha). The developing agent herein is a compound in which the oxidant thereof coupling-reacts with the coupler and which can generate an azomethine dye of cyan, magenta, or yellow, an indoaniline dye, or the like. For example, the compound includes a p-phenylenediamine derivative, a p-aminophenol derivative, or the like (the p-phenylenediamine derivative is preferable). More concrete descriptions are given in "4.3 Development Processing of Color Photograph" (pages 345 to 354) of "Shashin Kogaku no Kiso—Ginen Shashin hen (Elements of Photographic Engineering—Silver Photograph volume) edited by The Society of Photographic Science and Technology of Japan (1979, published by Koronasha).

The above yellow coupler includes couplers described in U.S. Pat. Nos. 3,933,501, 4,022,620, 4,326,024, 4,401,752, 4,248,961, JP-B-58-10739, U.K. Patent (U.K.P) No. 1,425,020, U.K.P-1,476,760, U.S. Pat. Nos. 3,973,968, 4,314,023, 4,511,649, European Patent (EP) No. 249,473A, EP-502,424A (represented in formulae (I) and (II)), EP-513,496A (represented in formulae (1) and (2) (especially, Y-28 in page 18)), EP-568,037A (represented in formula (I) in Claim 1), U.S. Pat. No. 5,066,576 (represented in general formula (I) in lines 45 to 55 in Column 1), JP-A-4-274425 (represented in general formula (I) in paragraph 0008), EP-498,381A1 (described in Claim 1 in page 40 (especially, D-35 in page 18)), EP-447,969A1 (represented in formula (Y) in page 4 (especially, Y-1 (page 17) and Y-54 (page 41)), and U.S. Pat. No. 4,476,219 (represented in formulae (II) to (IV) in lines 36 to 58 in Column 7 (especially, II-17, 19 (Column 17), II-24 (Column 19)).

The above magenta coupler includes couplers described in U.S. Pat. Nos. 4,310,619, 4,351,897, EP-73,636, U.S. Pat. Nos. 3,061,432, 3,725,067, Research Disclosure No. 24220 (June, 1984), Research Disclosure No. 24230 (June, 1984), JP-A-60-33552, JP-A-60-43659, JP-A-61-72238, JP-A-60-35730, JP-A-55-118034, JP-A-60-185951, U.S. Pat. Nos. 4,500,630, 4,540,654, 4,556,630, WO88/04795, JP-A-3-39737 (L-57 (lower right in page 11), L-68 (lower right in page 12), and L-77 (lower right in page 13)), EP-456,257 ([A-4]-63 (page 134), [A-4]-73, and -75 (page 139)), EP-486,965 (M-4, -6 (page 26), and M-7 (page 27)), EP-571.959A (M-45 (page 19), JP-A-5-204106 (M-1 (page 6)), JP-A-4-362631 (M-22 in paragraph 0237), U.S. Pat. Nos. 3,061,432, and 3,725,067.

The above cyan coupler includes couplers described in U.S. Pat. Nos. 4,052,212, 4,146,396, 4,228,233, 4,296,200, EP-73,636, JP-A-4-204843 (CX-1, 3, 4, 5, 11, 12, 14, and 15 (pages 14 to 16)), JP-A-4-43345 (C-7, 10 (page 35), 34, 35 (page 37), (I-1), (I-17) (pages 42 and 43)), and JP-A-6-67385 (represented in general formula (Ia) or (Ib) in Claim 1).

Other couplers described in JP-A-62-215272 (page 91), JP-A-2-33144 (pages 3 and 30), and EP-355,600A (pages 4, 5, 45, and 47) are also useful.

Among the compounds represented in the above formula (I), a compound which is represented in the following formula (II) is used particularly preferably as the magenta dye.

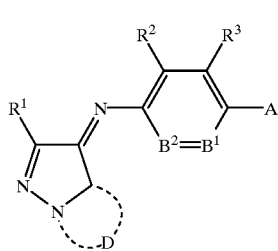

Formula (II)

In the above formula (II), $R^1$ represents a hydrogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, or $-NR^{30}SO_2R^{31}$. $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ represent respectively independently a hydrogen atom, an aliphatic group, or an aromatic group. Further, $R^2$, $R^3$, A, $B^1$, and $B^2$ are synonymous with those in the above formula (I) and preferable ranges thereof are also the same.

In the above formula (II), D represents an atom group which forms a five-membered or six-membered nitrogen-containing heterocyclic ring which may be substituted for at least one of an aliphatic group, an aromatic group, a heterocyclic group, a cyano group, $-OR^{81}$, $-SR^{82}$, $-CO_2R^{83}$, $-OCOR^{84}$, $-NR^{85}R^{86}$, $-CONR^{87}R^{88}$, $-SO_2R^{89}$, $-SO_2NR^{90}R^{91}$, $-NR^{92}CONR^{93}R^{94}$, $-NR^{95}CO_2R^{96}$, $-COR^{97}$, $-NR^{98}COR^{99}$, and $-NR^{100}SO_2R^{101}$. The heterocyclic ring may form a condensed ring with another ring. $R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$, and $R^{101}$ represent respectively independently a hydrogen atom, an aliphatic group, or an aromatic group.

Among the compounds represented in the above formula (II), a compound in which A is $-NR^4R^5$ is further preferable.

Next, the above formula (II) will be described in detail. Among the aforementioned, it is preferable that $R^1$ represents a hydrogen atom, an aliphatic group, an aromatic group, $-OR^{11}$, $-SR^{12}$, $-NR^{15}R^{16}$, $-SO_2R^{19}$, $-NR^{22}CONR^{23}R^{24}$, $-NR^{25}CO_2R^{26}$, $-NR^{28}COR^{29}$, or $-NR^{30}SO_2R^{31}$. It is more preferable that $R^1$ represents a hydrogen atom, an aliphatic group, an aromatic group, $-OR^{11}$, or $-NR^{15}R^{16}$. It is further preferable that $R^1$ represents a hydrogen atom, an alkyl group, a substituted alkyl group, an aryl group, a substituted aryl group, an alkoxy group, a substituted alkoxy group, a phenoxy group, a substituted phenoxy group, a dialkylamino group, or a substituted dialkylamino group. It is furthermore preferable that $R^1$ represents a hydrogen atom, an alkyl group having 1 to 10 carbon atoms, a substituted alkyl group having 1 to 10 carbon atoms, an aryl group having 6 to 10 carbon atoms, or a substituted aryl group having 6 to 10 carbon atoms. It is most preferable that $R^1$ represents a hydrogen atom, an alkyl group having 1 to 6 carbon atoms, or a substituted alkyl group having 1 to 6 carbon atoms.

It is preferable that D forms a 5-membered nitrogen-containing heterocyclic ring. The 5-membered nitrogen-containing heterocyclic ring includes, for example, an imidazole ring, a triazole ring, or a tetrazole ring.

Among the compounds represented in the above formula (II), an oil-soluble pyrazolotriazoleazomethine compound which is represented in the following formula (III) is particularly preferable.

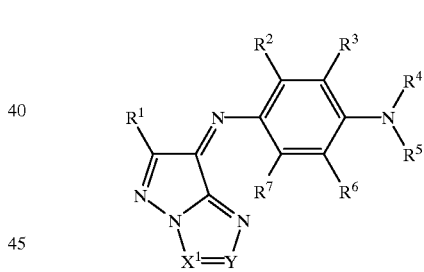

Formula (III)

In the above-described formula (III), $R^1$, $R^2$, $R^3$, $R^4$, $R^5$, $R^6$, and $R^7$ are synonymous with those in the above formula (II). $X^1$ and Y represent respectively independently $-C(R^8)=$ or $-N=$. $R^8$ represents a hydrogen atom, an aliphatic group, or an aromatic group. One of $X^1$ and Y is always $-N=$, and $X^1$ and Y are not $-N=$ at the same time.

At this time, it is preferable that $R^8$ represents a hydrogen atom, an alkyl group, a substituted alkyl group, an aryl group, or a substituted aryl group. It is more preferable that $R^8$ represents a hydrogen atom, a substituted alkyl group having 1 to 150 carbon atoms, or a substituted aryl group having 6 to 150 carbon atoms, and is most preferable that $R^8$ represents a substituted alkyl group having 1 to 100 carbon atoms or a substituted aryl group having 6 to 100 carbon atoms. Moreover, when $X^1$ and Y are $-C(R^8)=$ simultaneously, the respective $R^8$s may be combined with each other and form a ring. The ring to be formed is preferably a six-membered ring and is more preferably an aromatic ring (benzene ring or the like).

Among the compounds represented in the above formula (III), a pyrazolotriazoleazomethine compound in which $X^1$ is —N= and Y is —C($R^8$)= is preferable.
Illustrative compounds (M-1 to M-16) of the pyrazolotriazoleazomethine compound which is represented in the above formula (II) will be described hereinafter.
M-1
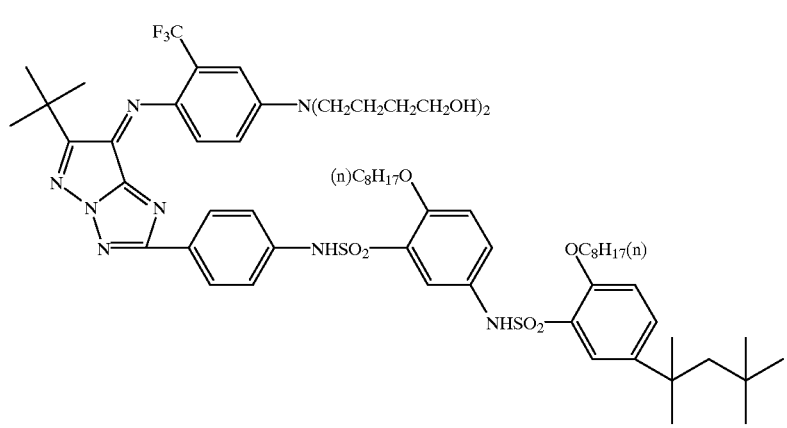
M-2
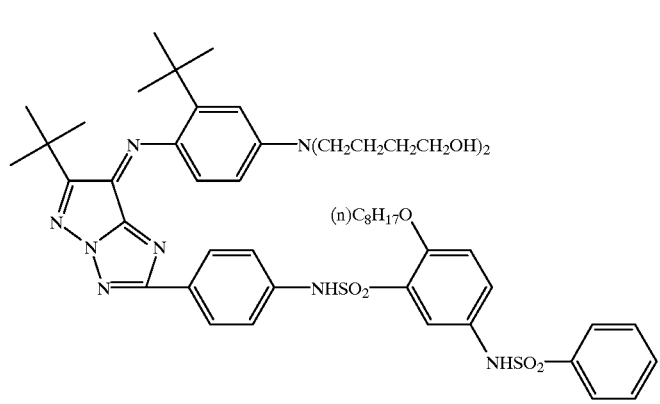
M-3
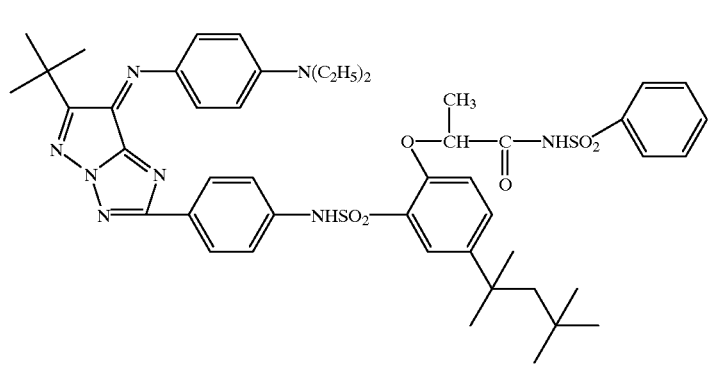

M-4
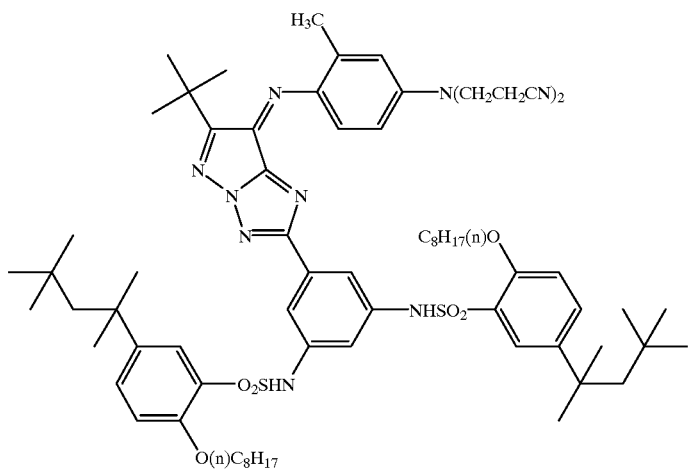
M-5
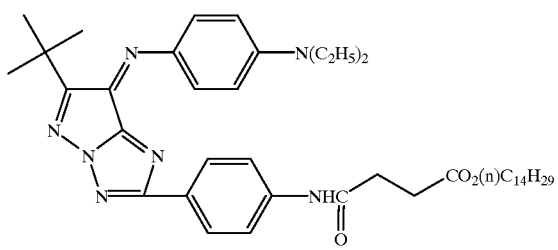
M-6
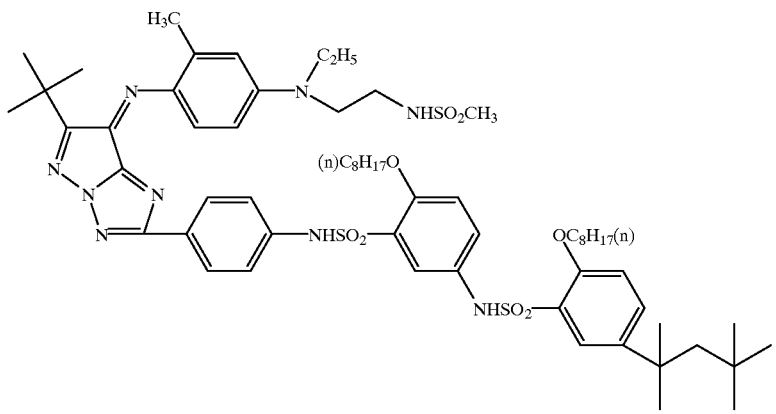
M-7
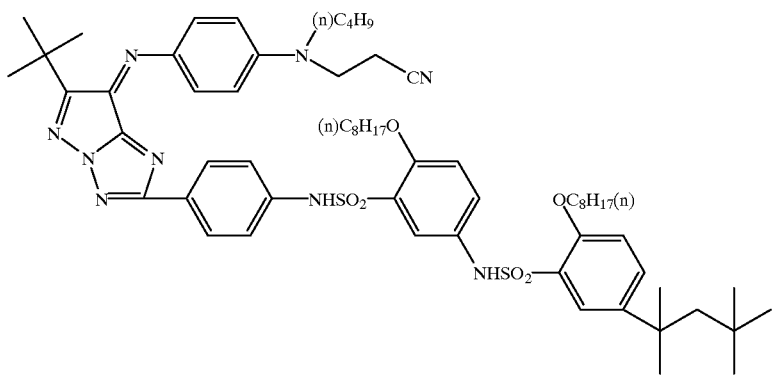

-continued
M-8
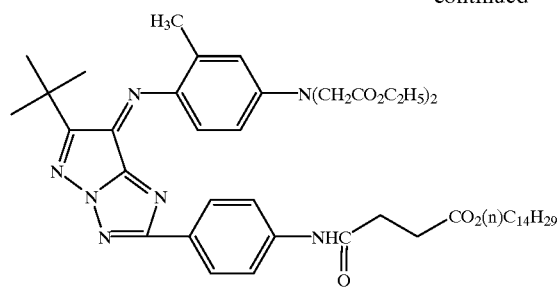
M-9
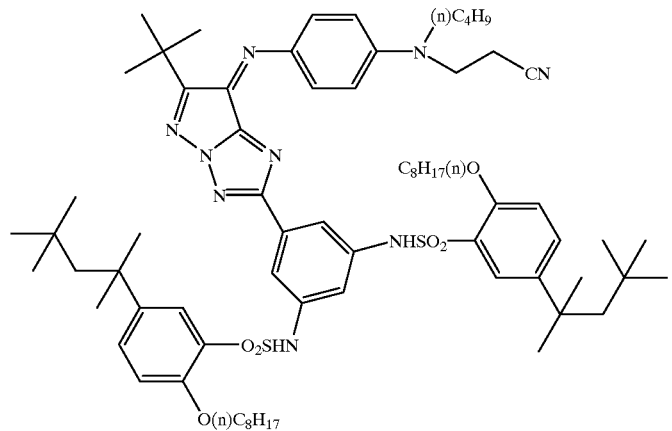
M-10
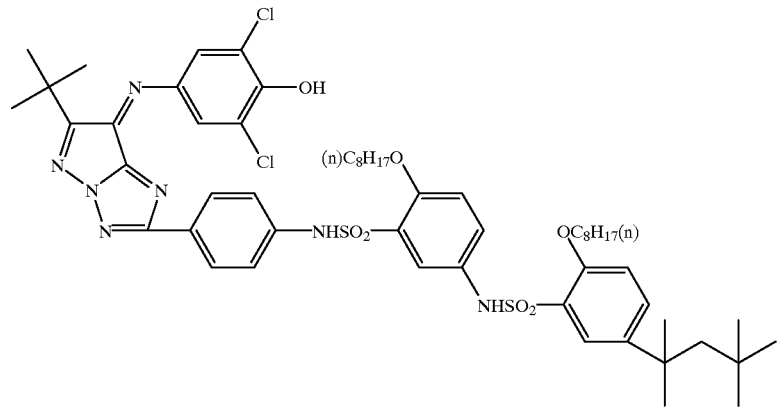
M-11
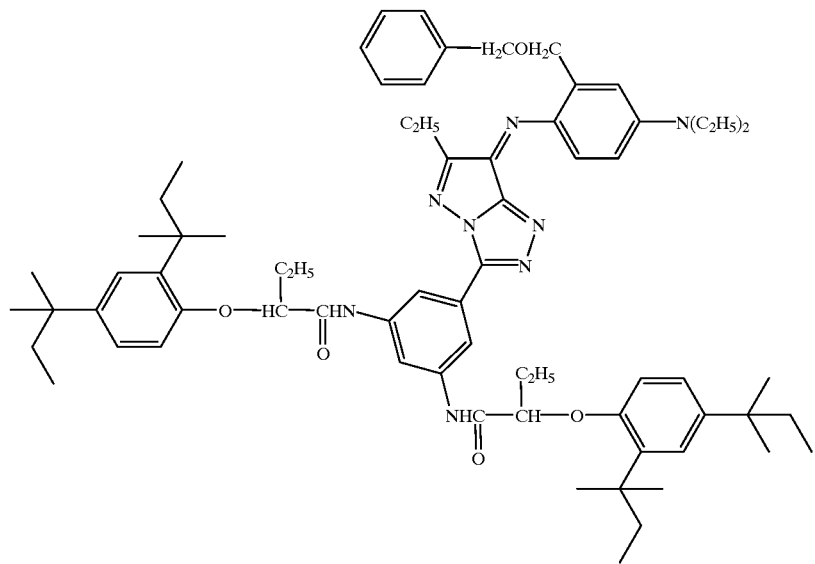

M-12
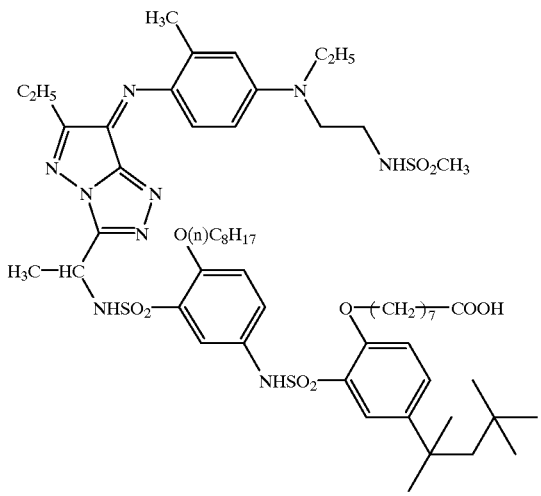
M-13
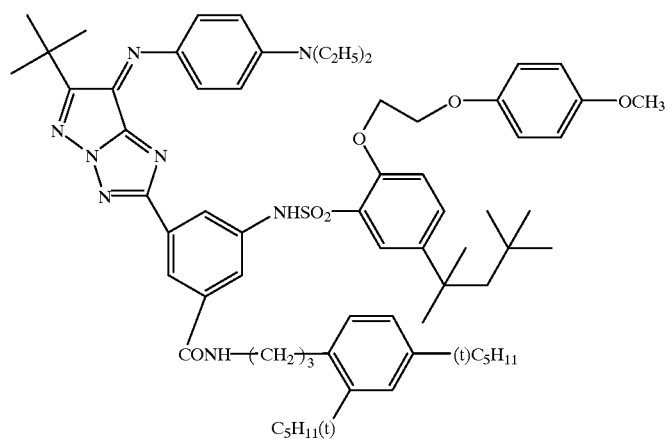
M-14
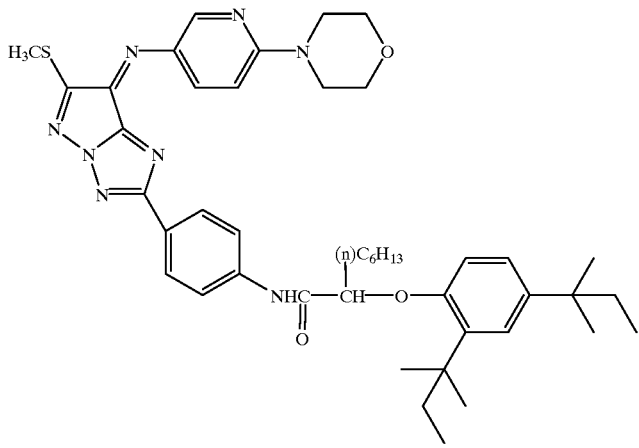

-continued

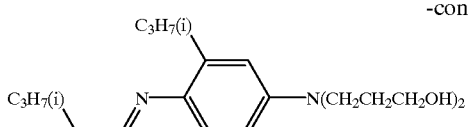

M-15

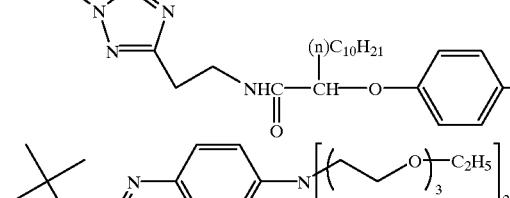

M-16

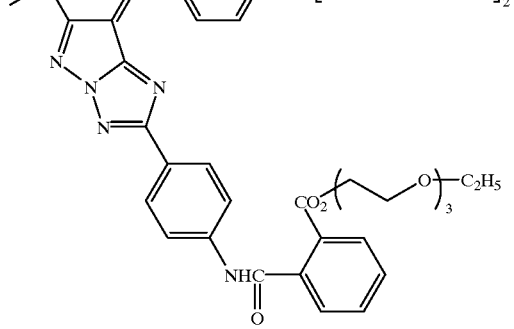

The compound which can be used in the present invention further includes illustrative compounds described in Japanese Patent Application No. 11-365189. However, the present invention is not limited to these compounds at all.

The dye which is represented in the above formula (II) can be synthesized with reference to methods described in, for example, JP-A-4-126772, JP-B-7-94180, and Japanese Patent Application No. 11-365187.

Moreover, pyrrolotriazoleazomethine compounds which are represented in the following formulae (IV-1) to (IV-4) are used particularly preferably as the above cyan dye.

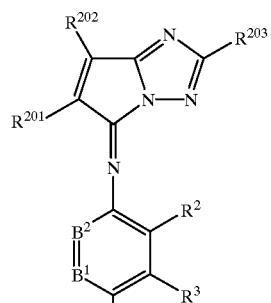
(IV-1)

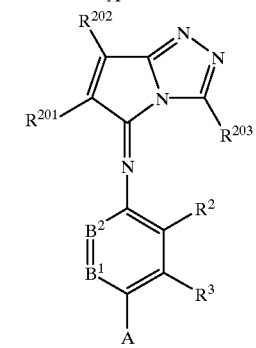
(IV-2)

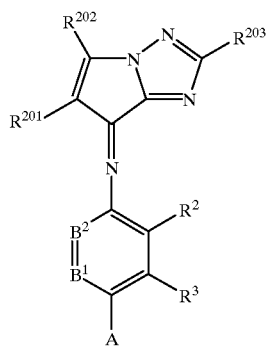
(IV-3)

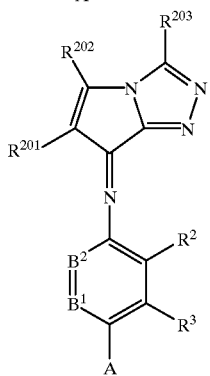
(IV-4)

In the above formulae (IV-1) to (IV-4), A, $R^2$, $R^3$, $B^1$, and $B^2$ are synonymous with those in the above formula (I) and preferable ranges thereof are also the same. $R^{201}$, $R^{202}$, and $R^{203}$ are synonymous respectively independently with $R^1$ in the above formula (II). $R^{201}$ and $R^{202}$ may be combined with each other and form a ring structure.

When $R^{201}$ of the pyrrolotriazoleazomethine compounds which are represented in the above formulae (IV-1) to (IV-4) is an electron attractive group having a Hammett substituent constant a $\sigma_p$ value of 0.30 or more, absorption of the compound is sharp, and therefore, it is more preferable. When the sum of Hammett substituent constant $\sigma_p$ values of $R^{201}$ and $R^{202}$ of the pyrrolotriazoleazomethine compound is 0.70 or more, hue of the compound is excellent as a cyan color, and therefore, it is furthermore preferable.

The hue will be further described in detail.

The pyrrolotriazoleazomethine compounds which are represented in the above formulae (IV-1) to (IV-4) can have various hues based on the combination of $R^{201}$, $R^{202}$, and $R^{203}$ and the combination of $R^2$, $R^3$, A, $B^1$, and $B^2$.

When $R^{201}$ of the pyrrolotriazoleazomethine compounds which are represented in the above formulae (IV-1) to (IV-4) is an electron attractive substituent, an absorption wave is sharper as compared to that of $R^{201}$ which is not an electron attractive substituent, and therefore, it is preferable. The stronger the degree of electron attracting ability, the sharper the absorption wave.

From this point, it is preferable that $R^{201}$ is an electron attractive group having a Hammett substituent constant $\sigma_p$ value of 0.30 or more rather than an alkyl group or an aryl group. It is more preferable that $R^{201}$ is an electron attractive group having a Hammett substituent constant $\sigma_p$ value of 0.45 or more, and is most preferable that $R^{201}$ is an electron attractive group having a Hammett substituent constant $\sigma_p$ value of 0.60 or more.

The above pyrrolotriazoleazomethine compound can be also used as a magenta dye and a cyan dye. However, it is more preferable that the compound is used as the cyan dye.

It should be noted that the pyrrolotriazoleazomethine compounds represented in the formulae (IV-1) to (IV-4) can be also used as the magenta dye.

In order that the pyrrolotriazoleazomethine compounds represented in the above formulae (IV-1) to (IV-4) are cyan dyes, it is preferable that the sum of Hammett substituent constant $\sigma_p$ values of $R^{201}$ and $R^{202}$ is 0.70 or more. When the sum of $\sigma_p$ values is less than 0.70, the absorption maximum wave is short for the cyan dye and the dye can be seen blue for human eyes, and therefore, it is not preferable. Above all, the Hammett substituent constant $\sigma_p$ value of $R^{202}$ is 0.30 or more is preferable. The sum of Hammett substituent constant $\sigma_p$ values of $R^{201}$ and $R^{202}$ is 2.0 or less is preferable.

The above electron attractive group having a Hammett substituent constant $\sigma_p$ value of 0.30 or more includes an acyl group, an acyloxy group, a carbamoyl group, an alkoxycarbonyl group, an aryloxycarbonyl group, a cyano group, a nitro group, an alkylsulfinyl group, an arylsulfinyl group, an alkylsulfonyl group, an arylsulfonyl group, a sulfamoyl group, an alkyl halide group, an alkoxy halide group, an aryloxy halide group, an alkylthio halide group, an aryl group which is substituted for an electron attractive group having two or more $\sigma_p$ values of 0.15 or more, and a heterocyclic group. More specifically, the electron attractive group includes an acyl group (e.g., acetyl, 3-phenylpropanoyl); an acyloxy group (e.g., acetoxy); a carbamoyl group (e.g., N-ethylcarbamoyl, N,N-dibutylcarbamoyl, N-(2-dodecyloxyethyl) carbamoyl, N-methyl-N-dodecylcarbamoyl); an alkoxycarbonyl group (e.g., methoxycarbonyl, butyloxycarbonyl, dodecyloxycarbonyl, octadecyloxycarbonyl); an aryloxycarbonyl group (e.g., phenoxycarbonyl); a cyano group; a nitro group; an alkylsulfinyl group (e.g., 3-phenoxypropylsulfinyl); an arylsulfinyl group (e.g., 3-pentadecylphenylsulfinyl); an alkylsulfonyl group (e.g., methanesulfonyl, octanesulfonyl); an arylsulfonyl group (e.g., benzenesulfonyl); a sulfamoyl group (e.g., N-ethylsulfamoyl, N,N-dipropylsulfamoyl); an alkyl halide group (e.g., trifluoromethyl, heptafluoropropyl); an alkoxy halide group (e.g., trifluoromethyloxy); an aryloxy halide group (e.g., pentafluorophenyloxy); an alkylthio halide group (e.g., difluoromethylthio); an aryl group which is substituted for an electron attractive group having two or more $\sigma_p$ values of 0.15 or more (e.g., 2,4-dinitrophenyl, 2,4,6-trichlorophenyl, pentachlorophenyl); and a heterocyclic group (e.g., 2-benzooxazolyl, 2-benzothiazolyl, 1-phenyl-2-benzimidazolyl, 5-chloro-1-tetrazolyl, 1-pyrrolyl.

The electron attractive group having a Hammett $\sigma_p$ value of 0.45 or more includes an acyl group (e.g., acetyl, 3-phenylpropanoyl); an alkoxycarbonyl group (e.g., methoxycarbonyl); an aryloxycarbonyl group (e.g., m-chlorophenoxycarbonyl); a cyano group; a nitro group; an alkylsulfinyl group (e.g., n-propylsulfinyl); an arylsulfinyl group (e.g., phenylsulfinyl); an alkylsulfonyl group (e.g., methanesulfonyl, n-octanesulfonyl); an arylsulfonyl group (e.g., benzenesulfonyl); a sulfamoyl group (e.g., N-ethylsulfamoyl, N,N-dimethylsulfamoyl); and an alkyl halide group (e.g., trifluoromethyl). The electron attractive group having a Hammett substituent constant $\sigma_p$ value of 0.60 or more includes a cyano group (0.66), a nitro group (0.78), and a methane sulfonyl group (0.72).

A preferable combination of $R^{201}$ and $R^{202}$ in which the sum of $\sigma_p$ values of $R^{201}$ and $R^{202}$ is 0.7 or more is as follows. Namely, $R^{201}$ is selected from a cyano group, an alkoxycarbonyl group, an alkylsulfonyl group, an arylsulfonyl group, or an alkyl halide group, and $R^{202}$ is selected from an acyl group, an acyloxy group, a carbamoyl group, an alkoxycarbonyl group, an aryloxycarbonyl group, a cyano group, an alkylsulfonyl group, an arylsulfonyl group, a sulfamoyl group, or an alkyl halide group.

A preferable structure of the pyrrolotriazoleazomethine compound which is used in the present invention is a compound which is represented in the following formula (IV-1a): wherein, $R^2$ is a hydrogen atom, an alkyl group having 1 to 4 carbon atoms, a substituted alkyl group having 1 to 4 carbon atoms, an alkoxy group having 1 to 4 carbon atoms, a halogen atom (fluorine, chlorine, bromine), an acylamino group having 1 to 5 carbon atoms, an aminocarbonylamino group having 1 to 5 carbon atoms, or an alkoxycarbonylamino group having 2 to 5 carbon atoms; $R^4$ and $R^5$ are respectively independently a hydrogen atom, an alkyl group having 1 to 18 carbon atoms, or a substituted alkyl group having 1 to 18 carbon atoms; $R^{201}$ and $R^{202}$ represent respectively independently an electron attractive group having a Hammett substituent constant $\sigma_p$ value of 0.30 or more; and $R^{203}$ is an alkyl group having 1 to 18 carbon atoms, a substituted alkyl group having 1 to 18 carbon atoms, an aryl group having a substituent and having 6 to 20 carbon atoms, or an aryl group having no substituent and having 6 to 20 carbon atoms. When the compound is used as the cyan dye, among the aforementioned, it is preferable that the sum of Hammett substituent constant $\sigma_p$ values of $R^{201}$ and $R^{202}$ is 0.70 or more, and is further preferable that the sum of $\sigma_p$ values thereof is 1.00 or more.

The most preferable pyrrolotriazoleazomethine compound which is used in the present invention has a structure which is represented in the formula (IV-1a): wherein, $R^2$ is a hydrogen atom or a methyl group; $R^4$ and $R^5$ are respectively independently an alkyl group having 1 to 5 carbon atoms; $R^{201}$ is a cyano group; $R^{202}$ is an alkoxycarbonyl group; and $R^{203}$ is an aryl group.

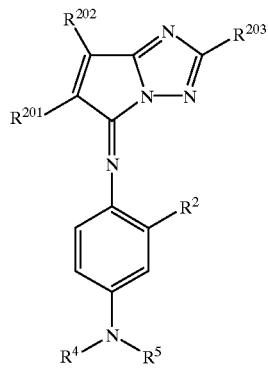

(IV-1a)

The above Hammett substituent constant is described in Japanese Patent Application No. 11-365188, and the $\sigma_p$ value of the present invention are the same as those defined in Japanese Patent Application No. 11-365188.

Illustrative compounds (C-1 to C-9) of the above pyrrolotriazoleazomethine will be described. However, the present invention is not limited to these compounds at all.

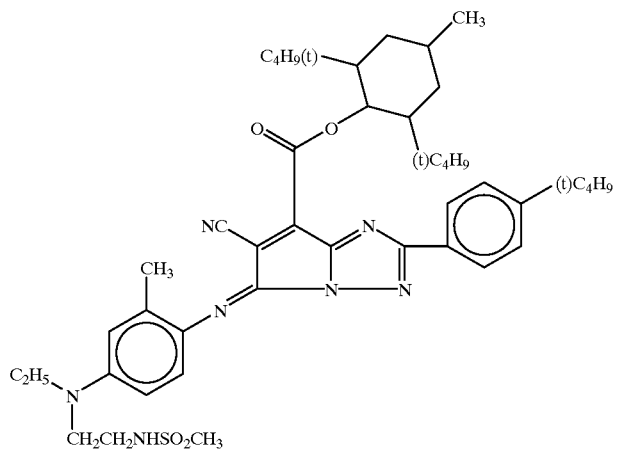

C-1

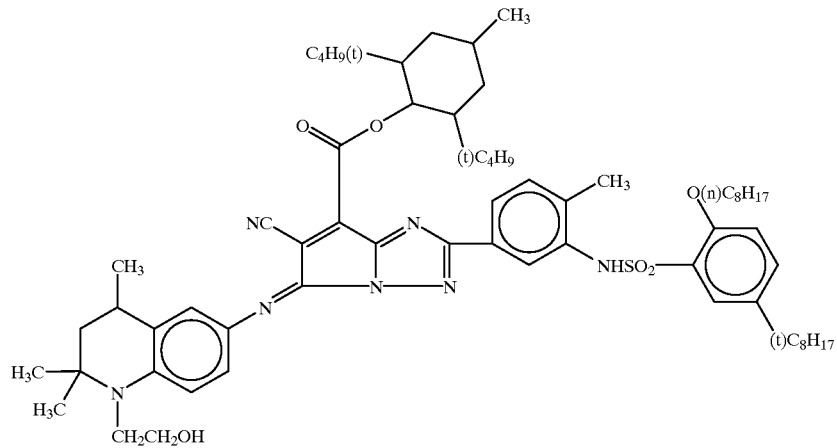

C-2

C-3
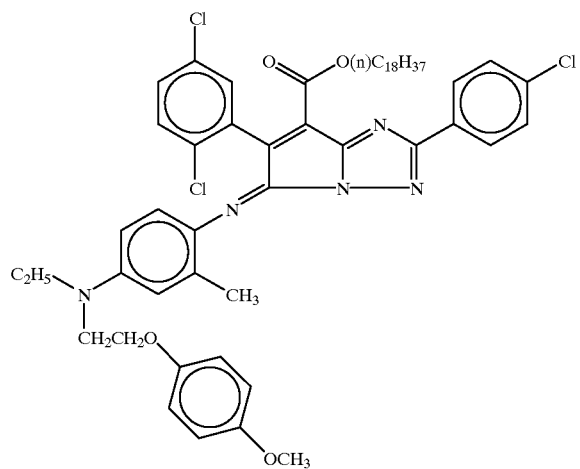
C-4
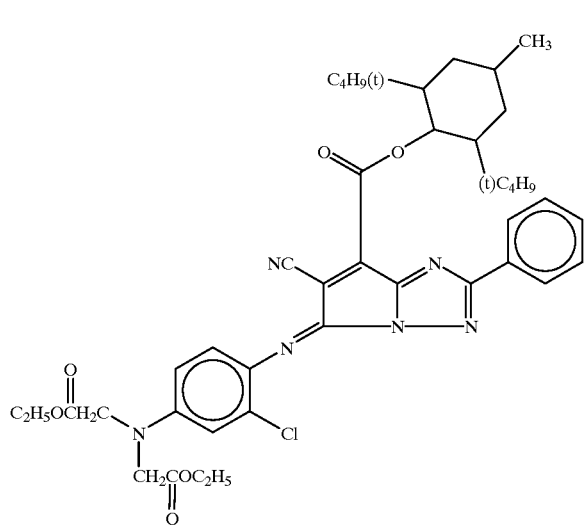
C-5
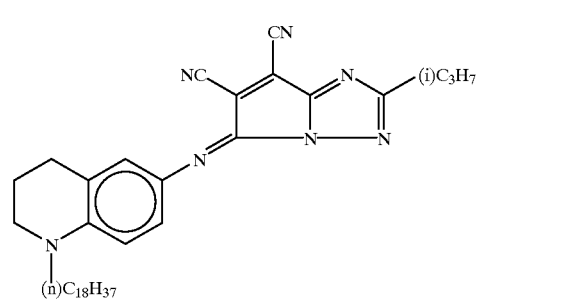
C-6
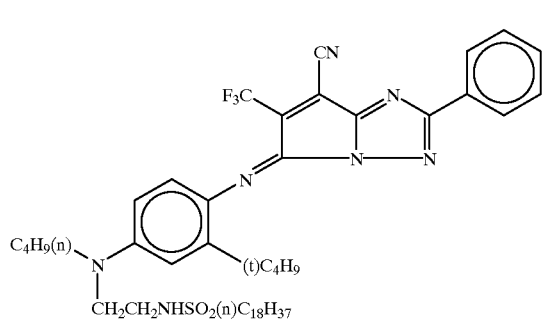

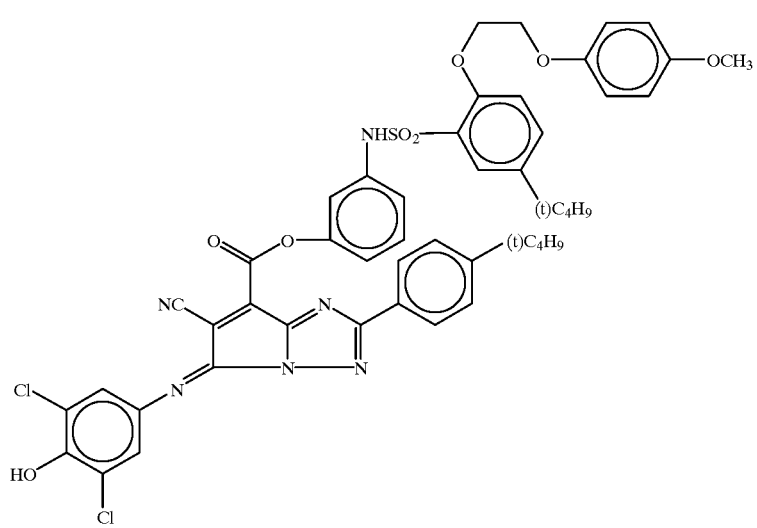

C-7

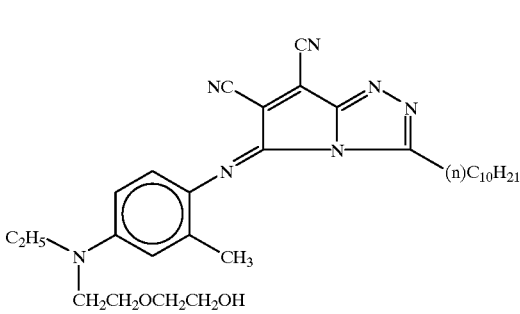

C-8

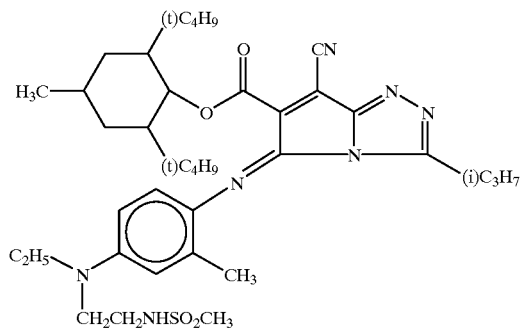

C-9

Moreover, the compound which can be used in the present invention further includes illustrative compounds described in Japanese Patent Application No. 11-365188. However, the present invention is not limited to these compounds at all.

The pyrrolotriazoleazomethine dyes which are represented in the above formulae (IV-1) to (IV-4) can be synthesized with reference to methods described in, for example, JP-A-5-177959, JP-A-9-292679, JP-A-10-62926, and Japanese Patent Application No. 11-365188.

High Boiling Point Organic Solvent

The boiling point of the high boiling point organic solvent is essentially 150° C. or higher, and preferably 170° C. or higher, so as to maintain preservation stability of images and inks.

The dielectric constant of the high boiling point organic solvent is essentially from 3 to 12, and preferably from 4 to 10, in order to improve solubility of the dye. The dielectric constant referred to herein is a dielectric constant relative to a vacuum at 25° C.

The high boiling point organic solvent is not limited, and may be appropriately selected depending on purpose. Examples thereof are compounds described in U.S. Pat. No. 2,322,027. Preferable are high boiling point organic solvents of phosphoric acid esters, aliphatic acid esters, phthalic acid esters, benzoic acid esters, phenols and amides.

As the high boiling point organic solvents, compounds represented by the following formulae [S-1]–[S-9] are particularly preferable.

Formula [S-1]

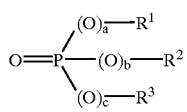

Formula [S-2]

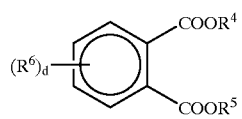

Formula [S-3]

Formula [S-4]

Formula [S-5]

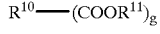

Formula [S-6]

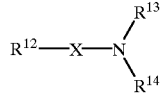

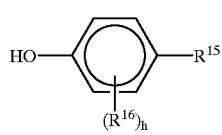

Formula [S-7]

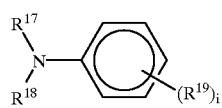

Formula [S-8]

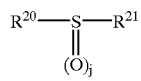

Formula [S-9]

In the formula [S-1], $R^1$, $R^2$ and $R^3$ each independently represents an aliphatic group or an aryl group. Symbols a, b, and c each independently represents 0 or 1.

In the formula [S-2], $R^4$ and $R^5$ each independently represents an aliphatic group or an aryl group.

$R^6$ is a halogen atom (the halogen atom is F, Cl, Br or I, which is the same as in the following), an alkyl group, an alkoxy group, an aryloxy group, an alkoxycarbonyl group, or an aryloxycarbonyl group.

Symbol d is an integer of 0 to 3, and when d is 2 or more, $R^6$s may be the same or different.

In the formula [S-3], Ar represents an aryl group, and symbol e is an integer of 1 to 6. $R^7$ represents a hydrocarbon group or a hydrocarbon group having an ether bond therein, which is having e valences.

In the formula [S4], $R^8$ represents an alipahtic group, and symbol f is an integer of 1 to 6. $R^9$ represents a hydrocarbon group or a hydrocarbon group having an ether bond therein, which is having f valences.

In the formula [S-5], symbol g is an integer of 2 to 6. $R^{10}$ represents a hydrocarbon group (except any aryl group) having g valences. $R^{11}$ represents an aliphatic group or an aryl group.

In the formula [S-6], $R^{12}$, $R^{13}$ and $R^{14}$ each independently represents a hydrogen atom, an aliphatic group or an aryl group. X represents —CO— or $SO_2$—. $R^{12}$ and $R^{13}$, or $R^{13}$ and $R^{14}$ may be bonded to each other to form a ring.

In the formula [S-7], $R^{15}$ represents an aliphatic group, alkoxycarbonyl group, an aryloxycarbonyl group, an alkylsulfonyl group, an arylsulfonyl group, an aryl group or a cyano group.

$R^{16}$ represents a halogen atom, an aliphatic group, an aryl group, an alkoxy group or an aryloxy group.

Symbol h is an integer of 0 to 3. In the case that h is 2 or more, $R^{16}$s may be the same or different.

In the formula [S-8], $R^{17}$ and $R^{18}$ each independently represents an aliphatic group or an aryl group. $R^{19}$ is a halogen atom, an aliphatic group, an aryl group, an alkoxy group or an aryloxy group. Symbol i is an integer of 0 to 4. In the case that i is 2 or more, $R^{19}$s may be the same or different.

In the formula [S-9], $R^{20}$ and $R^{21}$ each independently represents an aliphatic group or an aryl group. Symbol j is 1 or 2.

When $R^1$ to $R^6$, $R^8$, $R^{11}$ to $R^{21}$ are aliphatic groups or groups containing an aliphatic group in the formulae [S-1] to [S-9], the aliphatic groups may be any one of straight chain, branched chain and cyclic forms, may contain an unsaturated bond, and may have a substituent. Examples of the substituent include a halogen atom, an aryl group, an alkoxy group, an aryloxy group, an alkoxycarbonyl group, a hydroxyl group, an acyloxy group and an epoxy group.

When $R^1$ to $R^6$, $R^8$, $R^{11}$ to $R^{21}$ are cyclic alipahtic groups, i.e., cycloalkyl groups, or groups containing a cycloalkyl group in the formulae [S-1] to [S-9], the cycloalkyl group may contain an unsaturated bond in its 3 to 8-membered ring or may have a substituent or a crosslinking group. Examples of the substituent include a halogen atom, an aliphatic group, a hydroxyl group, an acyl group, an aryl group, an alkoxy group, an epoxy group, and an alkyl group. Examples of the crosslinking group include a methylene group, an ethylene group, and an isopropylidene group.

When $R^1$ to $R^6$, $R^8$, $R^{11}$ to $R^{21}$ are aryl groups or groups containing an aryl group in the formulae [S-1] to [S-9], the aryl group may be substituted with a halogen atom, an aliphatic group, an aryl group, an alkoxy group, an aryloxy group, an alkoxycarbonyl group or the like.

When $R^7$, $R^9$ or $R^{10}$ is a hydrocarbon group in the formulae [S-3], [S-4] and [S-5], the hydrocarbon group may contain a cyclic structure (for example, a benzene ring, a cyclopentane ring or a cyclohexane ring), an unsaturated bond or a substituent. Examples of the substituent include a halogen atom, a hydroxyl group, an acyloxy group, an aryl group, an alkoxy group, an aryloxy group, and an epoxy group.

In the formula [S-9], examples of a color non-developable ethylenic monomer which gives A1, A2, . . . , An include acrylic esters, methacrylic esters, vinyl esters, acrylamides, methacrylamides, olefins, styrenes, vinyl ethers, and acrylonitriles.

The following will describe particularly preferable high boiling point organic solvents in the present invention.

In the formula [S-1], $R^1$, $R^2$ and $R^3$ each represents an aliphatic group having 1–24 (preferably 4–18) carbon atoms (for example, n-butyl, 2-ethylhexyl, 3,3,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, 4-methylcyclohexyl, or an aryl group having 6–24 (preferably 6–18) carbon atoms (for example, phenyl, cresyl, p-nonylphenyl, xylyl, cumenyl, p-methoxyphenyl and p-methoxycarbonylphenyl).

Symbols a, b and c each independently represents 0 or 1, and preferably a, b and c each represents 1.

In the formula [S-2], $R^4$ and $R^5$ each represents an aliphatic group having 1–24 (preferably 4–18) carbon atoms (for example, the same alkyl groups as described as $R^1$, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, and 1-methylcyclohexyl), or an aryl group having 6–24 (preferably 6–18) carbon atoms (for example, the same aryl groups as described as $R^1$, 4-t-butylphenyl, 4-t-octylphenyl, 1,3,5-trimethylphenyl, 2,4-di-t-butylphenyl, and 2,4-di-t-pentylphenyl).

$R^6$ represents a halogen atom (preferably Cl), an alkyl group having 1–18 carbon atoms (for example, methyl, isopropyl, t-butyl, and n-dodecyl), an alkoxy group having 1–18 carbon atoms (for example, methoxy, n-butoxy, n-octyloxy, methoxyethoxy, and benzyloxy), an aryloxy group having 6–18 carbon atoms (for example, phenoxy, p-tolyloxy, 4-methoxyphenoxy, 4-t-butylphenoxy), an alkoxycarbonyl group having 2–19 carbon atoms (for example, methoxycarbonyl, n-butoxycarbonyl and 2-ethylhexyloxycarbonyl), or an aryloxycarbonyl group having 6–25 carbon atoms.

Symbol d represents 0 or 1.

In the formula [S-3], Ar represents an aryl group having 6–24 (preferably 6–18) carbon atoms (for example, phenyl, 4-chlorophenyl, 4-methoxyphenyl, 1-naphthyl, 4-n-butoxyphenyl, and 1,3,5-trimethylphenyl), and e is an integer of 1–4 (preferably 1–3). $R^7$ represents a hydrocarbon having e valences and 2–24 (preferably 2–18) carbon atoms [for example, the same alkyl groups as described as $R^4$, a cycloalkyl group, an aryl group, —(CH$_2$)$_2$—, the following groups],

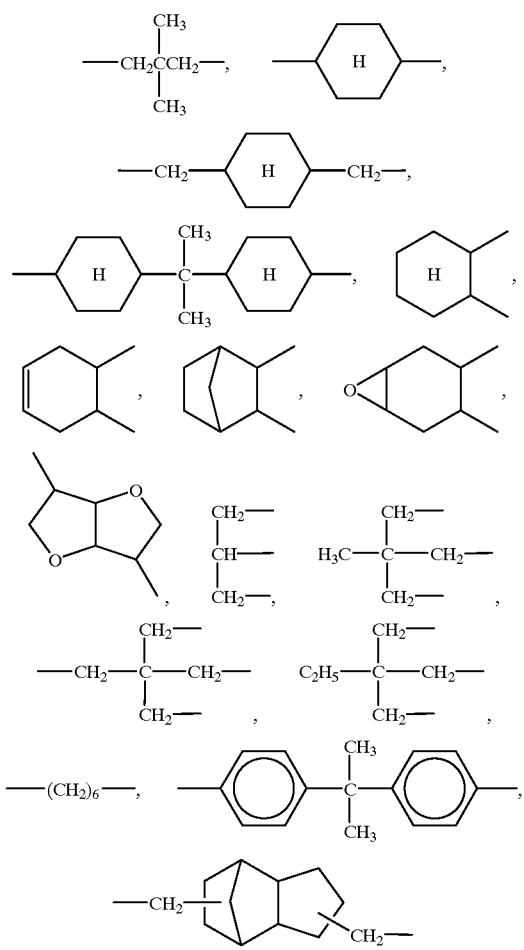

Alternatively, Ar represents a hydrocarbon group having e valences and 4–24 (preferably 4–18) carbon atoms, and having an ether bond therein [for example, —CH$_2$CH$_2$OCH$_2$CH$_2$—, —CH$_2$CH$_2$(OCH$_2$CH$_2$)$_3$—, —CH$_2$CH$_2$CH$_2$OCH$_2$CH$_2$CH$_2$—, and the following groups].

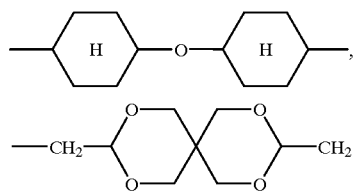

In the formula [S-4], $R^8$ represents an aliphatic group having 3–24 (preferably 3–17) carbon atoms (for example, n-propyl, 1-hydroxyethyl, 1-ethylpentyl, n-undecyl, pentadecyl, 8,9-epoxyheptadecyl, cyclopropyl, cyclohexyl, and 4-methylcyclohexyl), and f is an integer of 1–4 (preferably 1–3). $R^9$ represents a hydrocarbon group having f valences and 2–24 (preferably 2–18) carbon atoms, or a hydrocarbon group having f valences and 4–24 (preferably 4–18) carbon atoms and having an ether bond therein (for example, the same groups as described as $R^7$).

In the formula [S-5], g is 2–4 (preferably 2 or 3), and $R^{10}$ represnets a hydrocarbon group having g valences [for example, —CH$_2$—, —(CH$_2$)$_2$—, —(CH$_2$)$_4$—, —(CH$_2$)$_7$— and the following groups].

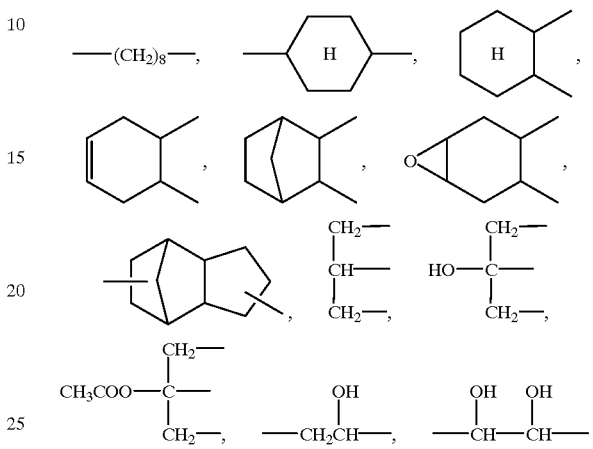

$R^{11}$ represents an aliphatic group having 1–24 (preferably 4–18) carbon atoms, or an aryl group having 6–24 (preferably 6–18) carbon atoms (for example, the same aliphatic groups and aryl groups as described as $R^4$).

In the formula [S-6], $R^{12}$ represents an aliphatic group having 1–20 carbon atoms [for example, n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, and 4-methylcyclohexyl], or an aryl group having 6–24 (preferably 6–18) carbon atoms (for example, the same aryl groups as described as the above-mentioned Ar).

$R^{13}$ and $R^{14}$ each represents an aliphatic group having 3–24 (preferably 3–18) carbon atoms (for example, isopropyl, n-butyl, n-hexyl, 2-ethylhexyl, n-dodecyl, cyclopentyl, and cyclopropyl), or an aryl group having 6–18 (preferably 6–15) carbon atoms (for example, phenyl, 1-naphthyl and p-tolyl).

$R^{13}$ and $R^{14}$ may be bonded to each other to form, together with N, a pyrrolidine ring, a piperidine ring, or a morpholine ring. $R^{12}$ and $R^{13}$ may be bonded to each other to form a pyrrolidone ring.

X represents —CO— or —SO$_2$—, and is preferably —CO—.

In the formula [S-7], $R^{15}$ represents an aliphatic group having 1–24 (preferably 3–18) carbon atoms (for example, methyl, isopropyl, t-butyl, t-pentyl, t-hexyl, t-octyl, 2-butyl, 2-hexyl, 2-octyl, 2-dodecy, 2-hexadecyl, t-pentadecyl, cyclopentyl and cyclohexyl), an alkoxycarbonyl group having 2–24 (preferably 5–17) carbon atoms (for example, n-butoxycarbonyl, 2-ethylhexyloxycarbonyl, and n-dodecyloxycarbonyl), an alkylsulfonyl group having 1–24 (preferably 3–18) carbon atoms (for example, n-butylsulfonyl and n-dodecylsulfonyl), an arylsulfonyl group having 6–30 (preferably 6–24) carbon atoms (for example, p-tolylsulfonyl, p-dodecylphenylsulfonyl and p-hexadecyloxyphenylsulfonyl), an aryl group having 6–32 (preferably 6–24) carbon atoms (for example, phenyl and p-tolyl), or a cyano group.

$R^{16}$ represents a halogen atom (preferably Cl), an alkyl group having 1–24 (preferably 3–18) carbon atoms (for example, the same alkyl groups as described as $R^{15}$), a cycloalkyl group having 5–17 carbon atoms (for example, cyclopentyl and cyclohexyl), an aryl group having 6–32 (preferably 6–24) carbon atoms (for example, phenyl and tolyl), an alkoxy group having 1–24 (preferably 1–18) carbon atoms (for example, methoxy, n-butoxy, 2-ethylhexyloxy, benzyloxy, n-dodecyloxy and n-hexadecyloxy), and an aryloxy group having 6–32 (preferably 6–24) carbon atoms (for example, phenoxy, p-t-butylphenoxy, p-t-octylphenoxy, m-pentadecylphenoxy and p-dodecyloxyphenoxy), and h is an integer of 1 or 2.

In the formula [S-8], $R^{17}$ and $R^{18}$ are the same as $R^{13}$ and $R^{14}$, and $R^{19}$ is the same as $R^{16}$.

In the formula [S-9], $R^{20}$ and $R^{21}$ are the same as $R^1$, $R^2$ and $R^3$, and j is 1 or 2 and is preferably 1.

The following will list up specific examples of the high boiling point organic solvent (S-1 to S-23 as compounds represented by the formula [S-1], S-24 to S-39 as compounds represented by the formula [S-2], S-40 to S-44 as compounds represented by the formula [S-3], S-45 to S-50 as compounds represented by the formula [S-4], S-51 to S-58 as compounds represented by the formula [S-5], S-59 to S-67 as compounds represented by the formula [S-6], S-68 to S-75 as compounds represented by the formula [S-7], S-76 to S-79 as compounds represented by the formula [S-8], and S-80 to S-81 as compounds represented by the formula [S-9]).

Compound Represented by the Formula [S-1]

Compound Represented by the Formula [S-2]
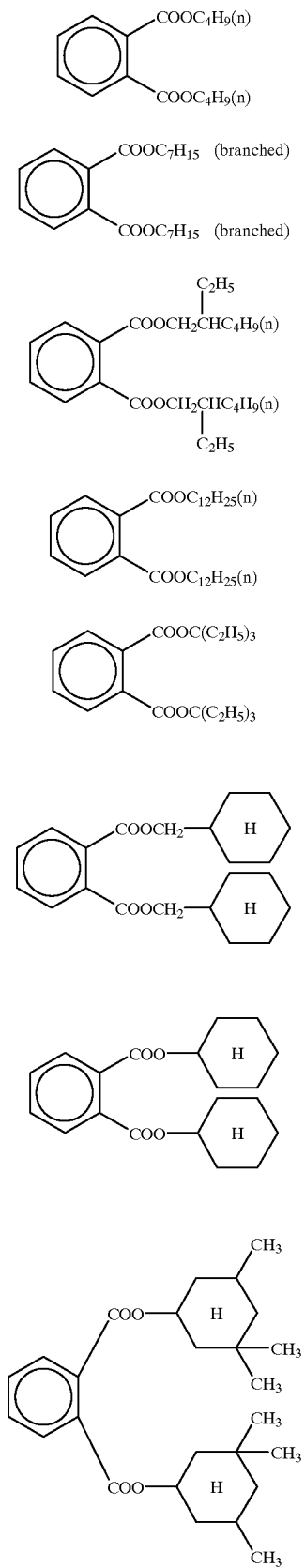
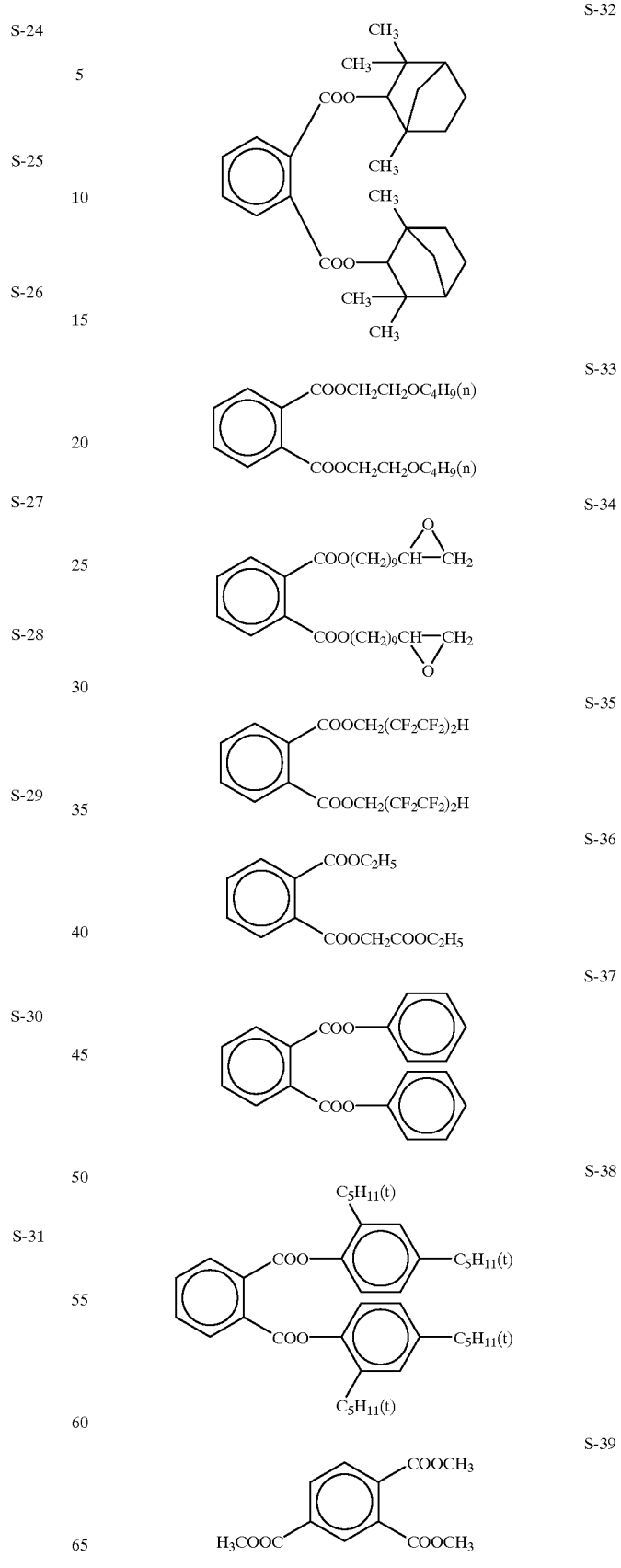

Compound Represented by the Formula [S-3]
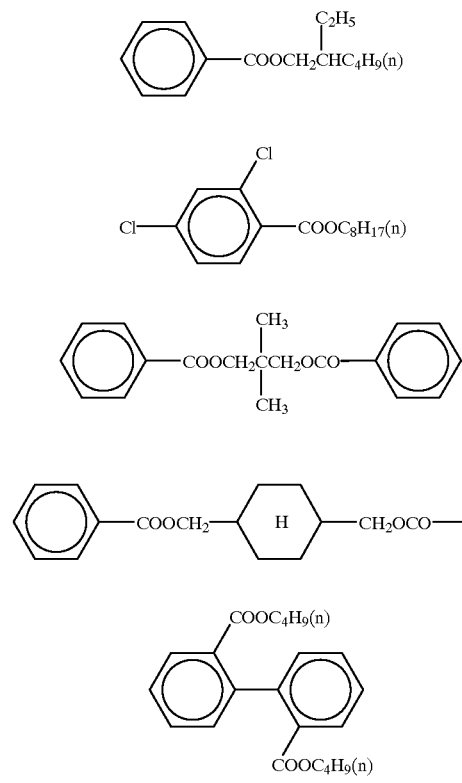
Compound Represented by the Formula [S-4]
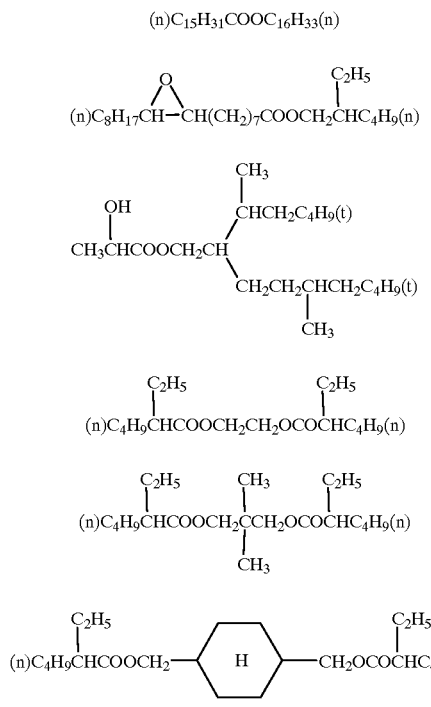
Compound Represented by the Formula [S-5]
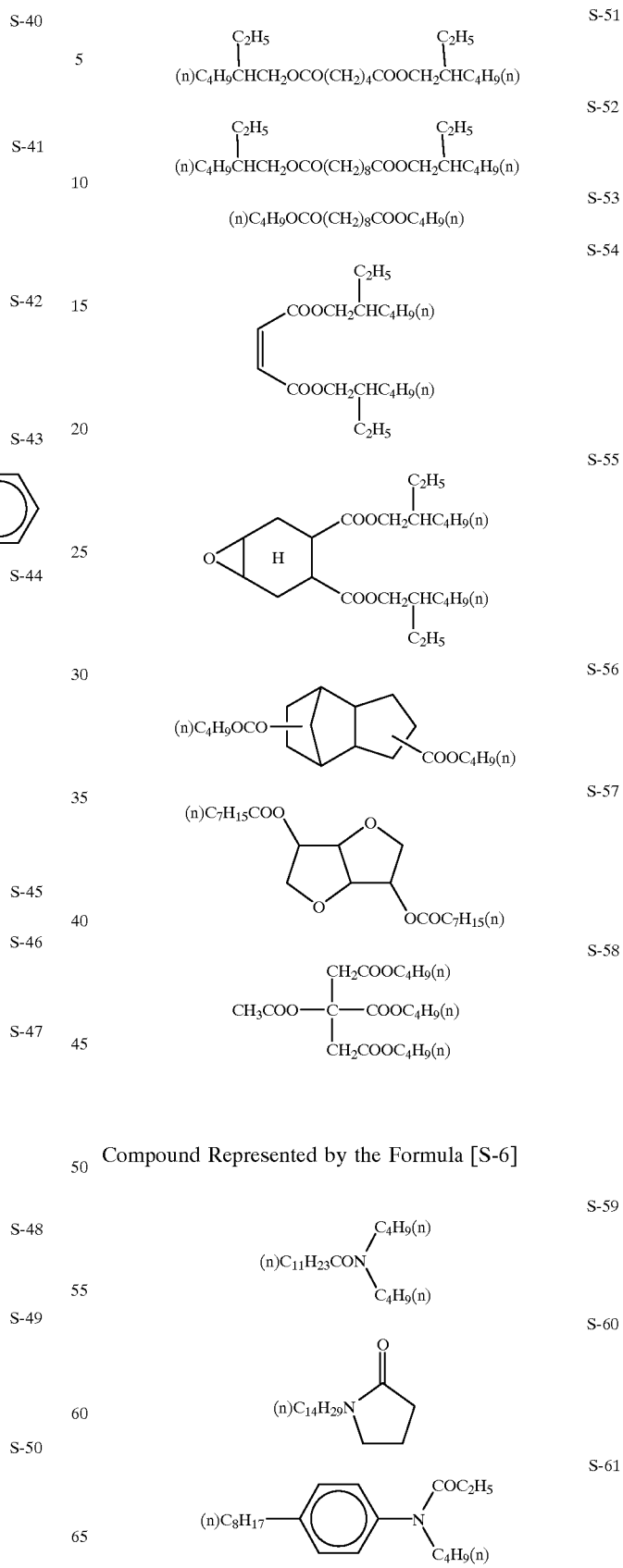
Compound Represented by the Formula [S-6]
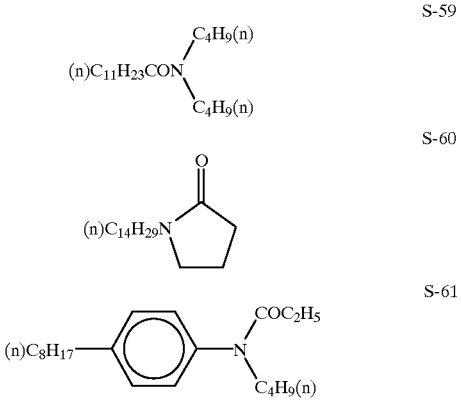

S-62 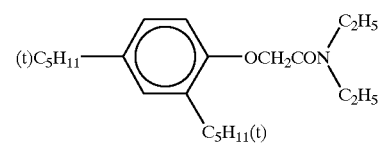
S-63 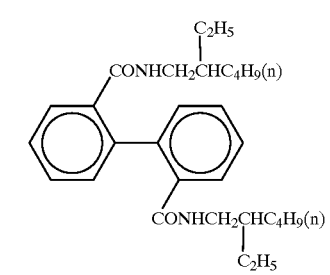
S-64 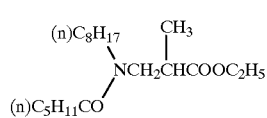
S-65 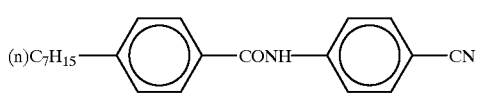
S-66 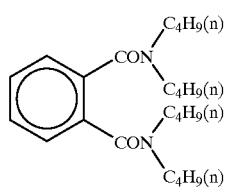
S-67 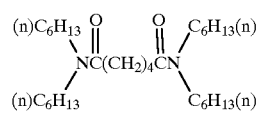
Compound Represented by the Formula [S-7]
S-68 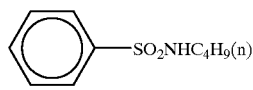
S-69 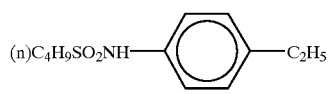
S-70 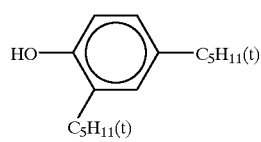
S-71 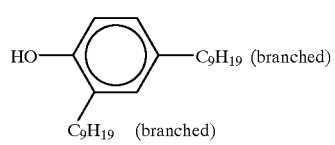
S-72 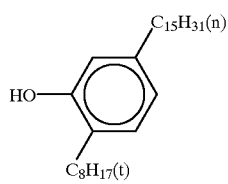
S-73 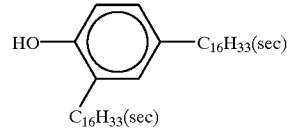
S-74 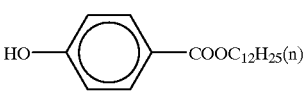
S-75 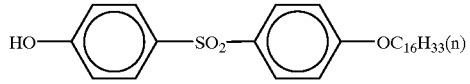
Compound Represented by the Formula [S-8]
S-76 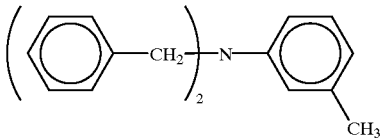
S-77 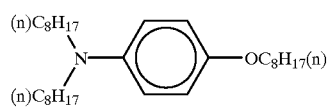
S-78 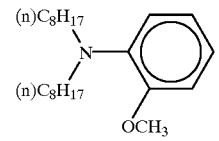
S-79 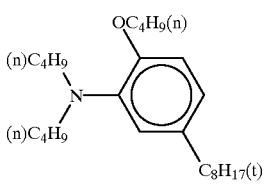
Compound Represented by the Formula [S-9]
S-80 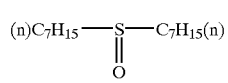
S-81 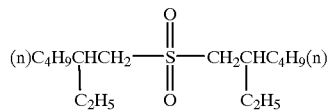

These high boiling point organic solvents may be used alone or in combination of two or more. Examples of the combination include a combination of tricresyl phosphate and dibutyl phthalate, a combination of trioctyl phosphate and di(2-ethylhexyl) cebacate.

Examples of the high boiling point organic solvents, other than the above-mentioned examples, and/or examples of methods of synthesizing these high boiling point organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-Nos. 276,319A, 286,253A, 289,820A, 309,158A, 309,159A, 309,160A, 509, 311A and 510,576A, East Germany Patent Nos. 147,009, 157,147, 159,573 and 225,240A, GB-2,091,124A, JP-A No. Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946 and 4-346338, and so on.

In the present invention, it is possible to use the high boiling point organic solvent and a low boiling point organic solvent. The low boiling point organic solvent is an organic solvent having a boiling point of 150° C. or lower (usually, about 30° C. or higher) at normal pressure. Preferred examples thereof include esters (for example, ethyl acetate, butyl acetate, ethyl propionate, β-ethoxyethyl acetate, and methylcellosolve acetate), alcohols (for example, isopropyl alcohol, n-butyl alcohol, and sec-butyl alcohol), ketones (for example, methyl isobutyl ketone, methyl ethyl ketone, and cyclohexanone), amides (for example, dimethylformamide, and N-methylpyrrolidone), and ethers(for example, tetrahydrofuran and dioxane).

Water-based Medium

An additive such as a surface active agent, a wetting agent, a stabilizer, an antiseptic, or the like, which is appropriately selected as occasion demands, is added to water or the mixture of water and a small amount of water-miscible organic solvent. Accordingly, the above water-based medium is formed.

Emulsification and Dispersion

Emulsification and dispersion can be performed by dispersing an oil phase wherein the oil-soluble dye is dissolved in the high boiling point organic solvent, or a mixed solvent of the high boiling point organic solvent and the low boiling point organic solvent, into a water-based phase based on the water-based medium to form oily droplets (dispersed particles).

In the ink-jet ink of the present invention, the amount of the low boiling point organic solvent added to the dye dispersed product before the emulsification and dispersion is preferably 1 to 80% by mass based on the above dye dispersed product. The amount of the above low boiling point organic solvent is more preferably 5 to 70% by mass, and is particularly preferably 10 to 50% by mass.

In general, the oily droplets (dispersed particles) are formed by adding the above-mentioned oil phase to the above-mentioned water-based phase. A so-called phase inversion emulsification, wherein the water-based phase is added to the oil phase, can be preferably used.

At the time of the emulsification and dispersion, if necessary, it is allowable to add additives such as a surfactant, a wetting agent, a dye stabilizer, an emulsion stabilizer, an antiseptic and an antifungal agent, described below, into at least one of the above-mentioned water-based phase and the above-mentioned oil phase.

Examples of the surfactant include anionic surfactants such as aliphatic acid salts, alkyl sulfate salts, alkylbenzenesulfonic acid salts, alkylnaphthalenesulfonic acid salts, dialkylsulfosuccinic acid salts, alkyl phosphate salts, naphthalenesulfonic acid formalin condensate, polyoxyethylenealkylsulfate salts and the like; nonionic surfactants such as polyoxyethylene alkyl ether, polyoxyethylenealkyl allyl ether, polyoxyethylene aliphatic acid esters, sorbitan aliphatic acid esters, polyoxyethylenesorbitan aliphatic acid esters, polyoxyethylenealkylamine, glycerin aliphatic acid esters, and oxyethyleneoxypropylene block copolymers; SURFYNOLS (made by Air Products & Chemicals), which is an acetylene type polyoxyethyleneoxide surfactant; amineoxide type amphoteric surfactants such as N,N-dimethyl-N-alkylamineoxide; and surfactants described in JP-A No. 59-157,636 pp. 37–38 and Research Disclosure No. 308119 (1989).

In the present invention, a water-soluble polymer, together with one or more of these surfactants, can be added to attain stabilization immediately after emulsification.

Examples of the water-soluble polymer include polyvinyl alcohol, polyvinylpyrrolidone, polyethyleneoxide, polyacrylic acid, polyacrylamide, and copolymers thereof. Natural water-soluble polymers such as polysaccharide, casein and gelatin are also preferable.

When the oil-soluble dye is dispersed by the emulsification and dispersion to prepare the water-based ink, it is particularly important to control the size of particles thereof. In order to improve color purity and density when an image is formed by ink jet recording, it is essential to make the average particle size of the dispersed particles in the dye dispersed product small. Volume average particle size is preferably 100 nm or less, and more preferably from 1 to 50 nm.

It has been found that the presence of coarse particles plays a very important role in printing performance. That is, it has been found that by blocking of nozzles of a printing head with coarse particles or forming of stains without blocking of nozzles, no ink jetting of an ink jet printing ink or uneven ink jetting is caused, which has a serious effect on printing performance. To prevent this problem, it is preferred that the number of particles having a size of 5 μm or more is set to 10 or less and that the number of particles having a size of 1 μm or more is set to 1000 or less, in 1 μl of the ink-jet ink that is produced.

As a method for removing the coarse particles, known centrifugal separation, precise filtration or the like can be used. The separating method may be performed immediately after the emulsification and dispersion, or performed after adding respective additives, for example, the wetting agent and the surfactant, to the emulsified and dispersed product just before charging the ink into an ink cartridge.

As an effective means for making the average particle size of the dispersed particles in the dye dispersed solution small or removing the coarse particles, an emulsifying and dispersing machine in which mechanical stirring is performed is preferably used.

As the emulsifying and dispersing machine, there can be used known machines, such as a simple stirrer, or an impeller stirring type, in-line stirring type, mill type (for example, colloid mill), or ultrasound wave type machine. In the present invention, a high-pressure emulsification and dispersion machine is preferred. A high-pressure homogenizer is particularly preferred.

Detailed mechanism of the high-pressure homogenizer is described in U.S. Pat. No. 4,533,254, JP-A No. 6-47264 and the like. Examples of commercially available homogenizers include GAULIN HOMOGENIZER (made by A. P. V Gaulin Inc.), MICROFLUIDIZER (made by Microfluidex Inc.) and ALTIMIZER (made by Sugino Machine Co., Ltd.).

A high-pressure homogenizer having a mechanism for preparing particles in a super-high-pressure jet flow, as described in U.S. Pat. No. 5,720,551, is particularly effective for the emulsification and dispersion of the present invention. An example of the emulsifying and dispersing machine using the super-high-pressure jet flow is DeBEE 2000 (Bee International Ltd.).

The pressure when the emulsifying and dispersing machine is used to carry out emulsification and dispersion is preferably 50 MPa or more (500 bar or more), more preferably 60 MPa or more (600 bar or more), and still more preferably 180 MPa or more (1800 bar or more).

In the present invention, it is particularly preferred that two or more emulsifying machines are used, utilizing, for example, a method of emulsifying raw materials with a stirring emulsifier and putting a resultant emulsion in a high-pressure homogenizer. It is also preferred to emulsify raw materials with such an emulsifier, and put the resultant emulsion into the high-pressure homogenizer after the addition of additives such as the wetting agent and the surfactant thereto, before the charging of the ink-jet ink to be produced into the cartridge.

In the ink-jet ink of the present invention, the amount of the above high boiling point organic solvent which has a boiling point of 150° C. or more and a specific inductive capacity at 25° C. of 3 to 12 is preferably 0.3 to 15% by mass based on the above ink-jet ink. The amount of the above high boiling point organic solvent to be used is more preferably 0.5 to 10% by mass, and is particularly preferably 1 to 5% by mass. Moreover, in the ink-jet ink of the present invention, the amount of the above oil-soluble dye to be used is preferably 0.1 to 10% by mass based on the above ink-jet ink. The amount of the above oil-soluble dye to be used is more preferably 0.1 to 5% by mass, and is particularly preferably 0.3 to 3% by mass.

In a case that both the high boiling point organic solvent and the low boiling point organic solvent are emulsified and dispersed, it is preferred to remove almost all of the low boiling point organic solvent, in view of stability of the emulsion, safety and health.

As a method for removing almost all of the low boiling point solvent, it is possible to adopt any one of various known methods such as evaporation, vacuum evaporation, and ultrafiltration, depending on the type of the low boiling point solvent. The low boiling point solvent is preferably removed as early as possible after the emulsification.

When the above dye dispersed solution is used as an ink-jet ink, the following additive is appropriately selected and an appropriate amount thereof can be added to the dye dispersed solution. The additive includes a drying preventing agent which prevents the clogging at a nozzle for the ink-jet ink due to the drying, a penetration accelerator for accelerating the penetration of an ink into a paper, an UV light absorber, an antioxidant, an anti-fungal agent, a pH adjuster, a surface tension adjuster, a dispersing agent, a dispersion stabilizer, an antifoaming agent, a viscosity adjusting agent, a rust preventing agent, a chelating agent, or the like.

In general, these additives are added to the above dye dispersed solution after the above oil-soluble dye is emulsified and dispersed. However, the additives may be added to the above oil phase or the above water phase at the time of emulsification and dispersion, such that the additives and the solution are subjected to a so-called "co-emulsification".

The drying preventing agent is preferably a water soluble organic solvent having a vapor pressure which is less than that of water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylol propane, and the like; lower alkyl ethers of polyhydric alcohols such as ethylene glycol monomethyl (or ethyl) ether, diethylene glycol monomethyl (or ethyl) ether, triethylene glycol monoethyl (or butyl) ether or the like; heterocyclics such as 2-pyrrolidone, N-methyl-2-pyrrolidone, 1,3-dimethyl-2-imidazolidinone, N-ethylmorpholine and the like; sulfur-containing compounds such as sulfolane, dimethylsulfoxide, 3-sulfolene and the like; polyfunctional compounds such as diacetone alcohol, diethanol amine, and the like; and urea derivatives.

Among these, polyhydric alcohols such as glycerin, diethylene glycol and the like are preferable. A single type of drying preventing agent may be used, or two or more types may be used in combination.

The amount of the drying preventing agent contained in the ink-jet ink is preferably 10 to 50% by mass.

Examples of the penetration accelerator include alcohols such as ethanol, isopropanol, butanol, di(tri)ethylene glycol monobutyl ether, 1,2-hexanediol and the like; sodium lauryl sulfate, sodium oleate, nonionic surfactants, and the like.

The penetration accelerator is contained in a range which does not cause bleeding of the printed characters or print through. If the penetration accelerator is contained in the ink-jet ink in an amount of 5 to 30% by mass, sufficient effects will usually be exhibited.

The UV light absorber is used for the purpose of improving the storability of images.

Examples of the UV light absorber are the benzotriazole compounds disclosed in JP-A Nos. 58-185677, 61-190537, 2-782, 5-197075, 9-34057, and the like; the benzophenone compounds disclosed in JP-A Nos. 46-2784, 5-194483, U.S. Pat. No. 3,214,463 and the like; the cinnamic acid compounds disclosed in JP-B Nos. 48-30492 and 56-21141, JP-A No. 10-88106 and the like; the triazine compounds disclosed in JP-A Nos. 4-298503, 8-53427, 8-239368, 10-182621, Japanese National Publication No. 8-501291, and the like; the compounds disclosed in Research Disclosure No. 24239; and compounds that absorb ultraviolet light and emit fluorescent light (so-called fluorescent whitening agents) such as stilbene compounds and benzooxazole compounds.

Antioxidants are used for the purpose of improving the storability of images.

For example, any of various types of organic color fading preventing agents and metal complex color fading preventing agents can be used as the antioxidant.

Examples of organic color fading preventing agents are hydroquinones, alkoxyphenols, dialkoxyphenols, phenols, anilines, amines, indanes, chromans, alkoxyanilines, heterocyclics, and the like.

Examples of metal complex color fading preventing agents include nickel complexes and zinc complexes. Specific examples include the compounds disclosed in Research Disclosure No. 17643 (VII, I through J), Research Disclosure No. 15162, Research Disclosure No. 18716 (page 650, left column), Research Disclosure No. 36544 (page 527), Research Disclosure No. 307105 (page 872), the compounds disclosed in the patents cited in Research Disclosure No. 15162, and the compounds included in the compound examples and general formulae of representative compounds disclosed on pages 127 through 137 of JP-A No. 62-215272.

Examples of the anti-fungal agent are sodium dehydroacetate, sodium benzoate, sodium pyridinethion-1-oxide, ethyl p-hydroxybenzoate, 1,2-benzoisothiazoline-3-on, and salts thereof. It is preferable to use the anti-fungal agent in the ink in an amount of 0.02 to 1.00% by mass.

Examples of the pH adjuster include hydroxides of alkali metals such as lithium hydroxide and potassium hydroxide; carbonates such as sodium carbonate and sodium hydrogencarbonate; inorganic bases such as potassium acetate, sodium silicate and disodium phosphate; and organic bases such as N-methyldiethanolamine and triethanolamine.

Examples of the surface tension adjuster include nonionic, cationic and anionic surfactants. For example, any surfactant that can be used in the above-mentioned emulsification and dispersion can be used. The surfactant used herein preferably has a solubility in water of 0.5% or more at 25° C.

As the dispersing agent and the dispersion stabilizer, the above-mentioned cationic, anionic and nonionic surfactants are preferred.

Examples of the antifoaming agent include fluorine-containing compounds, silicone type compounds, and chelate agents, a typical example of which is EDTA.

The pH of the ink-jet ink is preferably from 6 to 10 and more preferably from 7 to 10 from the viewpoint of improvement in preservation stability.

The surface tension of the ink-jet ink is preferably from 20 to 60 mN/m, and more preferably from 25 to 45 mN/m.

The viscosity of the ink-jet ink is preferably 30 mPa·s or less and more preferably 20 mPa·s or less.

The ink-jet ink of the present invention is favorably used in the following ink jet recording method of the present invention.

[Ink Jet Recording Method]

In the ink jet recording method, the ink-jet ink of the present invention is used to record an image on an image-receiving material. Ink nozzles and so on used at this time are not particularly limited, and can be appropriately selected depending on the purpose of recording.

Image-receiving Material

The type of the image-receiving material is not limited. This material is any known material on which images are formed. Examples thereof include plain paper; resin-coated paper; ink jet exclusive paper as described in, for example, JP-A Nos. 8-169172, 8-27693, 2-276670, 7-276789, 9-323475, 62-238783, 10-153989, 10-217473, 10-235995, 10-337947, 10-217597, 10-337947 and the like; films; paper that can also used for electrophotography; cloth; glass; metals; and ceramics.

In the present invention, recording paper and recording films comprising an image-receiving layer on a support are particularly preferred among the above-mentioned image-receiving materials.

Examples of the support include chemical pulp such as LBKP, NBKP and the like; mechanical pulp such as GP, PGW, RMP, TMP, CTMP, CMP, CGP, and the like; and used paper pulp such as DIP or the like. If needed, known pigments, binders, sizing agents, fixing agents, cationic agents, paper strength reinforcing agents and the like may be mixed in with the pulp. The support may be formed by using any type of machine such as a fourdrinier machine, a cylinder machine, or the like.

The support may be a synthetic paper, a plastic film sheet or the like.

The thickness of the support is preferably about 10 to 250 μm, and the weight thereof is preferably 10 to 250 g/m².

The image-receiving layer, as well as the backcoat layer which is selected as needed, may be directly laminated onto the support. Alternatively, the image-receiving layer and the backcoat layer may be provided after subjected to size pressing or coating of an undercoat layer by using starch, polyvinyl alcohol or the like.

The support may be subjected to flattening processing by a calendar device such as a machine calendar, a TG calendar, a soft calendar or the like.

Among the substrates, paper whose both surfaces are laminated with polyolefin (e.g., polyethylene, polystyrene, polyethyleneterephthalate, polybutene, and copolymers thereof), and plastic film are preferable. It is more preferable to include in the polyolefin a white pigment (e.g., titanium oxide, zinc oxide) or a hue providing dye (e.g., cobalt blue, ultramarine blue, neodium oxide).

The image-receiving layer includes a pigment, water based binder, mordant, water-proofing agent, light-resistance improving agent, surfactant, and other additives.

As the pigment, a white pigment is preferable.

Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate, and the like; and organic pigments such as styrene pigments, acrylic pigments, urea resins, melamine resins and the like.

Among these, porous inorganic pigments are preferable, and synthetic amorphous silica whose pores have a large surface area is particularly preferable.

Either silicic anhydride obtained by a dry-type production method or a hydrated silicic acid obtained by a wet-type production method can be used as the synthetic amorphous silica. However, hydrated silicic acid is particularly preferable.

Examples of the water based binder include water soluble polymers such as polyvinyl alcohol, silanol modified polyvinyl alcohol, starch, cationic starch, casein, gelatin, carboxymethyl cellulose, hydroxyethyl cellulose, polyvinylpyrrolidone, polyalkylene oxide, polyalkylene oxide derivatives and the like; water dispersible polymers such as styrene-butadiene latex, acrylic emulsions, and the like; and the like.

One type of water based binder may be used, or two or more types may be used in combination.

Among these, polyvinyl alcohol and silanol modified polyvinyl alcohol are preferable from the standpoints of adhesion to the pigment and separation-resistance of the image-receiving layer.

The mordant is preferably immobilized, and thus, a polymer mordant is preferable.

Examples of polymer mordants are disclosed in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236, and U.S. Pat. Nos. 2,484,430, 2,548, 564, 3,148,061, 3,309,690, 4,115,124, 4,124,386, 4,193,800, 4,273,853, 4,282,305, and 4,450,224. The polymer mordants disclosed on pages 212 to 215 of JP-A No. 1-161236 are suitably used. It is preferable to use these polymer mordants because images having excellent image quality are obtained and light-resistance of the images is improved.

The water-proofing agent is used for the purpose of making the images waterproof.

Cationic resins are preferable as the water-proofing agent. Examples of the cationic resin include polyamide-polyamine epichlorohydrine, polyethyleneimine, polyaminesulfone, dimethyldiallyl ammonium chloride polymer, cationic polyacrylamide, and the like. Among these cationic resins, polyamidepolyamine epichlorohydrine is particularly preferable.

The contained amount of the cationic resin is preferably 1 to 15% by mass, and more preferably 3 to 10% by mass, with respect to the total solid content of the image-receiving layer.

Examples of the light-resistance improving agent are zinc sulfate, zinc oxide, hindered amine antioxidants, benzotriazole ultraviolet light absorbers such as benzophenone, and the like. Among these, zinc sulfate is particularly preferable.

The surfactant functions as a coating aid, a detachability improving agent, a slippage improving agent, and an antistatic agent.

Examples of the surfactants are disclosed in JP-A Nos. 62-173463 and 62-183457.

Organic fluoro compounds may be used instead of the surfactant.

It is preferable that the organic fluoro compounds are hydrophobic.

Examples of the organic fluoro compounds are fluorine based surfactants, oily fluorine-based compounds (e.g., fluorine oil), and solid fluorine based compound resins (e.g., tetrafluoroethylene resin), as well as the compounds disclosed in JP-B No. 57-9053 (columns 8 through 17), and JP-A Nos. 61-20994 and 62-135826.

Examples of other additives are pigments dispersion aids, thickeners, anti-foaming agents, dyes, fluorescent whitening agents, preservatives, pH adjusting agents, matte agents, film hardeners, and the like. The image-receiving layer may be comprised of one layer or may be comprised of two or more layers.

The thickness of the image-receiving layer is preferably from 10 to 50 μm and more preferably from 20 to 40 μm.

The backcoat layer includes a white pigment, a water based binder and other components.

Examples of the white pigments are white inorganic pigments such as light-weight calcium carbonate, heavy-weight calcium carbonate, kaolin, talc, calcium sulfate, barium sulfate, titanium dioxide, zinc oxide, zinc sulfade, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate, magnesium hydroxide, and the like; and organic pigments such as styrene based plastic pigments, acrylic based plastic pigments, polyethylene, microcapsules, urea resins, melamine resins and the like.

Examples of the water based binder include water soluble polymers such as styrene/maleate salt copolymer, styrene/acrylate salt copolymer, polyvinyl alcohol, silanol modified polyvinyl alcohol, starch, cationized starch, casein, gelatin, carboxymethyl cellulose, hydroxyethyl cellulose, polyvinylpyrrolidone, and the like; water dispersible polymers such as styrene butadiene latex, acrylic emulsion, and the like; and the like.

Examples of the other components are anti-foaming agents, foaming suppressing agents, dyes, fluorescent whitening agents, preservatives, waterproofing agents, and the like.

A polymer latex may be added to each of the layers of the recording paper and the recording film.

The polymer latex is used for the purpose of improving the film properties such as stability of dimensions, prevention of curling, prevention of adhesion, prevention of cracking of the film, and the like.

Examples of the polymer latex are those disclosed in JP-A Nos. 62-245258, 62-1316648 and 62-110066. When a polymer latex having a low glass transition temperature (of 40° C. or less) is added to a layer including the mordant, cracking and curling of the layer can be prevented. Further, by adding a polymer latex having a high glass transition temperature to the backcoat layer, curling can be prevented.

The ink-jet ink of the present invention can be applied to any ink jet recording method. For example, the ink-jet ink of the present invention can be suitably used in a charge control method in which ink is discharged by utilizing electrostatic attraction; a drop on demand method (pressure pulse method) utilizing the vibration pressure of a piezo element; an acoustic ink jet method in which electric signals are converted to acoustic beams, the beams are applied to the ink, and the emission pressure is utilized so as to discharge the ink; a thermal ink jet (bubble jet) method in which the ink is heated to form air bubbles and the generated pressure is utilized; and the like.

The above ink jet recording methods include a method in which plural drops of an ink, which has a low density and is called a photoink, are expelled in small volumes; a method in which image quality is improved by using plural inks having substantially the same hue and different densities; and a method utilizing a colorless, transparent ink.

EXAMPLES

Examples of the present invention will be described hereinafter. However, the present invention is not limited to these examples at all.

Example 1

Production of Sample 101

8 g of the oil-soluble dye (the above illustrative M-6) and 5 g of dioctyl sodium sulfosuccinate were dissolved at 70° C. in the mixture of 6 g of the high boiling point organic solvent (the above illustrative S-2, boiling point of 245° C.), 10 g of the high boiling point organic solvent (the above illustrative S-11, boiling point of 223° C.), and 50 ml of ethyl acetate. 500 ml of deionized water was added to the solution while stirring with a magnetic stirrer, and an oil-in-water type product in which coarse particles are dispersed (hereinafter, "coarse particles dispersed product") was produced.

Next, at MICROFLUIDIZER (MICROFLUIDEX INC), which is a high-pressure emulsifying and dispersing device, the coarse particles dispersed product was passed through five times at a pressure of 60 MPa (600 bar) so as to became particulate, and was subjected to emulsification and dispersion. Further, the obtained emulsified and dispersed product was desolvated by a rotary evaporator until odor of the ethyl acetate disappears.

The emulsified and dispersed product (dye dispersed product) of the oil-soluble dye was obtained in this way, and then, 140 g of diethylene glycol, 50 g of glycerin, 7 g of SURFYNOL 465 (Air Products & Chemicals), and 900 ml of deionized water were added to the product. Accordingly, a light magenta ink for ink jet was produced.

Production of Sample 102

Except that the above high boiling point solvents in Sample 101 were removed, Sample 102 was produced in the same way as in the above Sample 101.

Production of Sample 103

Except that 16 g of a comparative compound (r-1), which is an acrylic polymer, was used instead of the above high boiling point solvents in Sample 101, Sample 103 was produced in the same way as in Sample 101.

Comparative Compound (r-1)

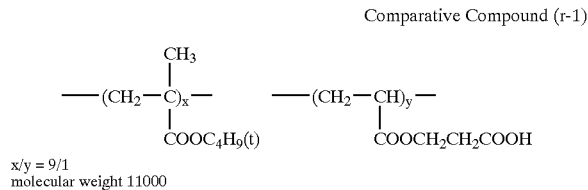

x/y = 9/1
molecular weight 11000

Production of Sample 104

Except that 16 g of toluene (boiling point of 110° C.) was used instead of the above high boiling point solvents in Sample 101, Sample 104 was produced in the same way as in Sample 101.

Production of Sample 105

Except that 16 g of cyclohexylbenzene (boiling point of 235° C.) was used instead of the above high boiling point solvents in Sample 101, Sample 105 was produced in the same way as in Sample 101.

Production of Sample 106

Except that 16 g of a comparative compound (r-2) (boiling point of 149° C.) was used instead of the above high boiling point solvents in Sample 101, Sample 106 was produced in the same way as in Sample 101.

Comparative Compound (r-2)

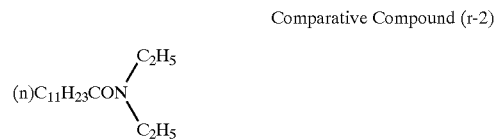

Production of Sample 107

Except that a GAULIN homogenizer (A. P. V GAULIN INC) was used instead of the MICROFLUIDIZER, which is a high-pressure emulsifying and dispersing device, in Sample 101 and emulsification and dispersion was effected at 45 MPa (450 bar), Sample 107 was produced in the same way as in Sample 101.

Production of Sample 108

Except that a high speed impeller type homogenizer (manufactured by Nippon Seiki Co., Ltd.) was used instead of the MICROFLUIDIZER, which is a high-pressure dispersing device, in Sample 101, stirring was carried out at number of rotations of 10000 rpm for 10 minutes, and emulsification and dispersion was effected, Sample 108 was produced in the same way as in Sample 101.

Production of Sample 109

Except that a DeBEE 20000 (BEE INTERNATIONAL LTD) was used instead of the MICROFLUIDIZER, which is a high-pressure emulsifying and dispersing device, in Sample 101 and emulsification and dispersion was effected at 210 MPa (2100 bar), Sample 109 was produced in the same way as in Sample 101.

Production of Sample 110

Except that the ethyl acetate in Sample 101 was not used and the process of desolvating by the rotary evaporator in Sample 101 was omitted, Sample 110 was produced in the same way as in Sample 101.

Production of Sample 111

Except that the DeBEE 2000 was used instead of the MICROFLUIDIZER, which is a high-pressure emulsifying and dispersing device, in Sample 101 and emulsification was effected at a pressure of 210 MPa (2100 bar), Sample 111 was produced in the same way as in Sample 101.

Production of Sample 112

Except that the high boiling point organic solvent (the above illustrative S-11) in Sample 101 was not used, Sample 112 was produced in the same way as in Sample 101.

Production of Sample 113

Except that the high boiling point organic solvent (the above illustrative S-2) in Sample 101 was not used, Sample 113 was produced in the same way as in Sample 101.

Samples 101 to 111 (the dye dispersed products) were obtained in this way, and the volume average particle sizes of the dispersed particles included in the Samples were measured using MICROTRACK UPA (Nikkiso Co., Ltd.). Table 1 shows the results.

Next, Samples 101 to 111 (the dye dispersed products) were used as inks for ink jet and were accommodated into cartridges of an ink jet printer PM670C (manufactured by Seiko Epson Corporation). Images were recorded and printed onto photographic printing papers of Seiko Epson Corporation by the printer thereof. Printing performances were evaluated on the basis of a relative printing density when the printing density of a genuine light magenta ink of Seiko Epson Corporation was 1, existence of generation of streaks, blur of thin lines, stains when the image was rubbed by a finger immediately after the printing, the rate of reduction of the image density when the image was immersed into water for one minute. Further, the states of inks, volume average particle sizes, and printing performances after the inks for ink jet were stored at 60° C. for one week were evaluated. Table 2 shows the results.

TABLE 1

| Sample Number | C. E./ P. I. | High Boiling Point Organic Solvent | Dielectric Constant of High Boiling Point Organic Solvent | Low Boiling Point Organic Solvent | Emulsification Pressure (MPa) | Volume Average Particle Size (nm) |
|---|---|---|---|---|---|---|
| Sample 101 | P. I. | S-2/S-11 | 7.3/4.5 | ethyl acetate | 60 | 56 |
| Sample 102 | C. E. | none | — | ethyl acetate | 60 | 231 |
| Sample 103 | C. E. | (acrylic polymer) (r-1) | — | ethyl acetate | 60 | 78 |
| Sample 104 | C. E. | toluene | 2.2 | ethyl acetate | 60 | 125 |

TABLE 1-continued

| Sample Number | C. E./ P. I. | High Boiling Point Organic Solvent | Dielectric Constant of High Boiling Point Organic Solvent | Low Boiling Point Organic Solvent | Emulsification Pressure (MPa) | Volume Average Particle Size (nm) |
|---|---|---|---|---|---|---|
| Sample 105 | C. E. | cyclohexyl-benzene | 1.9 | ethyl acetate | 60 | 87 |
| Sample 106 | C. E. | r-2 | 13.5 | ethyl acetate | 60 | 149 |
| Sample 107 | P. I. | S-2/S-11 | 7.3/4.5 | ethyl acetate | 45 | 97 |
| Sample 108 | P. I. | S-2/S-11 | 7.3/4.5 | ethyl acetate | (stirring/ emulsification) | 105 |
| Sample 109 | P. I. | S-2/S-11 | 7.3/4.5 | ethyl acetate | 210 | 23 |
| Sample 110 | P. I. | S-2/S-11 | 7.3/4.5 | none | 60 | 154 |
| Sample 111 | P. I. | S-2/S-11 | 7.3/4.5 | none | 210 | 28 |
| Sample 112 | P. I. | S-2 | 7.3 | ethyl acetate | 60 | 64 |
| Sample 113 | P. I. | S-11 | 4.5 | ethyl acetate | 60 | 44 |

"P. I." = Present Invention
"C. E." = Comparative Example

TABLE 2

| Sample Number | C. E./ P. I | Image Density | Evaluation of Streaks | Blur of Thin Lines | Stain caused by Rubbing | Density Reduction when Immersed into Water (%) | Printing performance of ink after time passage (60° C., one week) |
|---|---|---|---|---|---|---|---|
| EPSON Light magenta | C. E. | 1.00 | ○ | Δ | x (drying defect) | 45 | ○ |
| Sample 101 | P. I. | 1.15 | ○ | ○ | ○ | 2 | ○ |
| Sample 102 | C. E. | 0.78 | x | Δ | x | 15 | x (dye deposits) |
| Sample 103 | C. E. | 0.85 | x | ○ | x | 8 | x (dye deposits) |
| Sample 104 | C. E. | 0.79 | x | ○ | ○ | 3 | x (coarser) |
| Sample 105 | C. E. | 0.88 | x | ○ | ○ | 2 | x (coarser) |
| Sample 106 | C. E. | 0.91 | x | ○ | ○ | 2 | x (coarser, separate) |
| Sample 107 | P. I. | 1.08 | Δ~○ | ○ | ○ | 3 | Δ |
| Sample 108 | P. I. | 1.05 | Δ | ○ | ○ | 1 | Δ |
| Sample 109 | P. I. | 1.33 | ○ | ○ | ○ | 0 | ○ |
| Sample 110 | P. I. | 1.01 | Δ | ○ | ○ | 2 | Δ |
| Sample 111 | P. I. | 1.29 | ○ | ○ | ○ | 2 | ○ |
| Sample 112 | P. I. | 1.05 | ○ | ○ | ○ | 2 | ○ |
| Sample 113 | P. I. | 1.16 | ○ | ○ | ○ | 3 | ○ |

"P. I." = Present Invention
"C. E." = Comparative Example

As can be seen clearly, the inks for ink jet of the present invention have high density at the time of printing, have few generation of streaks caused by the clogging of a nozzle, have excellent rubbing performance and water tolerance, and further have excellent time passage stability. In particular, when the high-pressure emulsifying device was used and emulsification and dispersion was carried out at a high pressure of 60 MPa (600 bar) or more, printing density, evaluation of streaks, and time passage stability of inks are excellent.

Example 2

Instead of a magenta dye (d-7) in Sample 101 of Example 1, a yellow dye (y-1) and a cyan dye (c-1) were respectively used and emulsification and dispersion was carried out in the same way as in Example 1. Inks for ink jet were thereby produced.

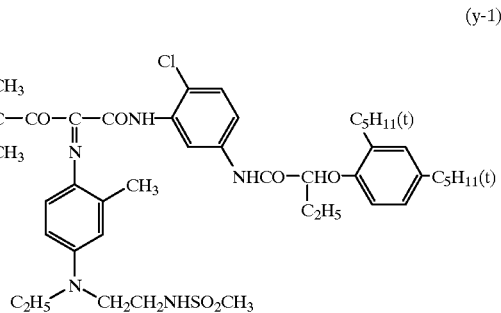

(y-1)

-continued (c-1)

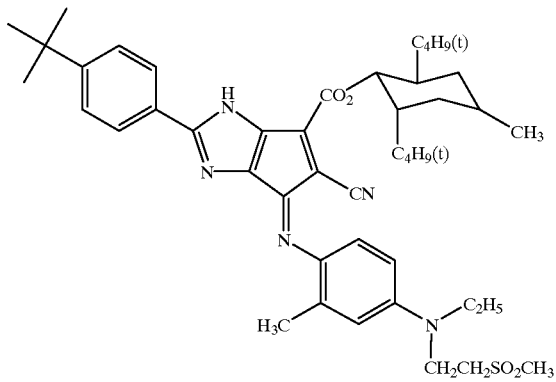

A yellow ink (Sample 201) and a cyan ink (Sample 202) were obtained. The obtained inks were printed by an EPSON 770C ink jet printer in the same manner as in Example 1, good printing performances were obtained. Moreover, the magenta ink (Sample 101), the yellow ink (Sample 201), and the cyan ink (Sample 202) were mixed, such that a black ink was produced. When the black ink was printed in the same way as described above, a good printing performance was obtained.

Example 3

Inks which are the same as those produced in Example 1 were accommodated into cartridges of an ink jet printer BJ-F850 (manufactured by Canon Inc.). Images were printed onto photo glossy papers GP-301 manufactured by Canon Inc. by the above-described printing machine. When evaluations which are the same as those of Example 1 were made, the results which are the same as those of Example 1 were obtained.

What is claimed is:

1. An ink-jet ink which comprises a dye dispersed product, an oil-soluble dye being dissolved in a high boiling point organic solvent which has a boiling point of 150° C. or more and a specific inductive capacity at 25° C. of 3 to 12, said oil-soluble dye being emulsified and dispersed in a water-based medium, and said dye dispersed product being formed, wherein the volume average particle size of dispersed particles in said dye dispersed product is from 1 to 100 nm.

2. An ink-jet ink which comprises a dye dispersed product, an oil-soluble dye being dissolved in a high boiling point organic solvent which has a boiling point of 150° C. or more and a specific inductive capacity at 25° C. of 3 to 12, said oil-soluble dye being emulsified and dispersed in a water-based medium, and said dye dispersed product being formed, wherein said oil-soluble dye is an oil-soluble dye which is represented in the following formula (I):

Formula (I)

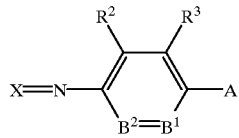

wherein, X represents the residue of a color coupler;
A represents one of —$NR^4R^5$ and a hydroxyl group;
$R^4$ and $R^5$ represent respectively independently one of a hydrogen atom, an aliphatic group, an aromatic group, and a heterocyclic group;
$B^1$ represents one of =$C(R^6)$— and =N—;
$B^2$ represents one of —$C(R^7)$= and —N=;
$R^2$, $R^3$, $R^6$, and $R^7$ represent respectively independently one of a hydrogen atom, a halogen atom, an aliphatic group, an aromatic group, a heterocyclic group, a cyano group, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$, and —$NR^{70}SO_2R^{71}$; and
$R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ represent respectively independently one of a hydrogen atom, an aliphatic group, and an aromatic group.

3. An ink-jet ink according to claim 2, wherein said oil-soluble dye which is represented in the formula (I) is an oil-soluble dye which is represented in the following formula (II):

Formula (II)

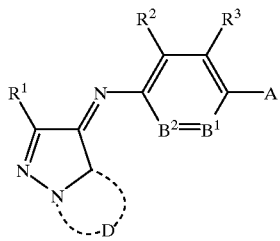

wherein, $R^2$, $R^3$, A, $B^1$, and $B^2$ are synonymous with $R^2$, $R^3$, A, $B^1$, and $B^2$ in the formula (I);
$R^1$ represents one of a hydrogen atom, an aliphatic group, an aromatic group, a heterocyclic group, a cyano group, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}CO_2R^{26}$, —$COR^{27}$, —$NR^{28}COR^{29}$, and —$NR^{30}SO_2R^{31}$;
$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ represent respectively independently one of a hydrogen atom, an aliphatic group, and an aromatic group;
D represents an atom group which forms one of a five-membered nitrogen-containing heterocyclic ring and a six-membered nitrogen-containing heterocyclic ring which may be substituted for at least one of an aliphatic group, an aromatic group, a heterocyclic group, a cyano group, —$OR^{81}$, —$SR^{82}$, —$CO_2R^{83}$, —$OCOR^{84}$, —$NR^{85}R^{86}$, —$CONR^{87}R^{88}$, —$SO_2R^{89}$, —$SO_2NR^{90}R^{91}$, —$NR^{92}CONR^{93}R^{94}$, —$NR^{95}CO_2R^{96}$, —$COR^{97}$, —$NR^{98}COR^{99}$, and —$NR^{100}SO_2R^{101}$; and
$R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$, and $R^{101}$ represent respectively independently one of a hydrogen atom, an aliphatic group, and an aromatic group.

4. An ink-jet ink according to claim 3, wherein said oil-soluble dye which is represented in the formula (II) is an oil-soluble dye which is represented in the following formula (III):

Formula (III)

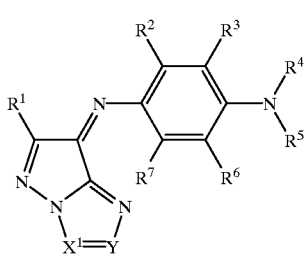

wherein, $R^1$, $R^2$, $R^3$, $R^4$, $R^5$, $R^6$, and $R^7$ are synonymous with $R^1$, $R^2$, $R^3$, $R^4$, $R^5$, $R^6$, and $R^7$ in the formula (II);

$X^1$ and Y represent respectively independently one of —C($R^8$)= and —N=;

$R^8$ represents one of a hydrogen atom, an aliphatic group, and an aromatic group; and one of $X^1$ and Y is always —N=, and $X^1$ and Y are —N= at different times.

5. An ink-jet ink according to claim 2, wherein said oil-soluble dye which is represented in the formula (I) is at least one of oil-soluble dyes which are represented in the following formulae (IV-1) to (IV-4):

(IV-1)

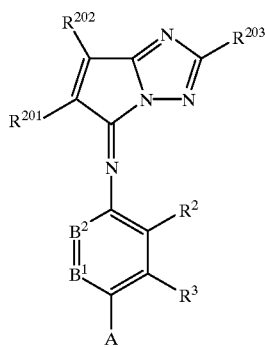

(IV-2)

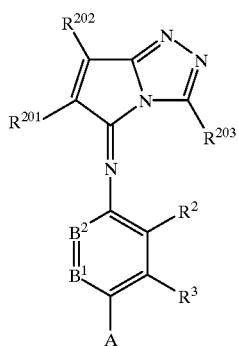

(IV-3)

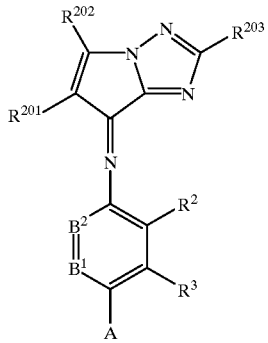

(IV-4)

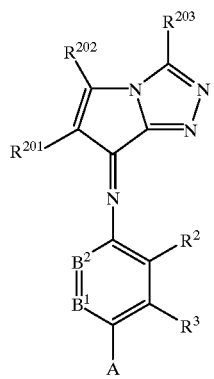

wherein, A, $R^2$, $R^3$, $B^1$, and $B^2$ are synonymous with A, $R^2$, $R^3$, $B^1$, and $B^2$ in the above formula (I);

$R^{201}$, $R^{202}$, and $R^{203}$ represent respectively independently one of a hydrogen atom, an aliphatic group, an aromatic group, a heterocyclic group, a cyano group, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}CO_2R^{26}$, —$COR^{27}$, —$NR^{28}COR^{29}$, and —$NR^{30}SO_2R^{31}$;

$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ represent respectively independently one of a hydrogen atom, an aliphatic group, and an aromatic group; and $R^{201}$ and $R^{202}$ may be combined with each other and form a ring structure.

6. An ink-jet ink which comprises a dye dispersed product, an oil-soluble dye being dissolved in a high boiling point organic solvent which has a boiling point of 150° C. or more and a specific inductive capacity at 25° C. of 3 to 12, said oil-soluble dye being emulsified and dispersed in a water-based medium, and said dye dispersed product being formed, wherein said high boiling point organic solvent is at least one of high boiling point organic solvents which are represented in the following formulae [S-1] to [S-9]:

Formula [S-1]

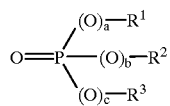

-continued

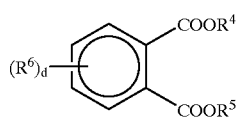
Formula [S-2]

Formula [S-3]

Formula [S-4]

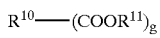
Formula [S-5]

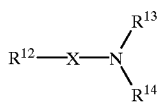
Formula [S-6]

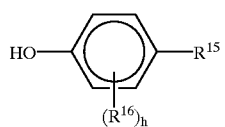
Formula [S-7]

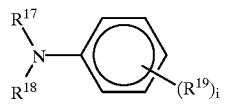
Formula [S-8]

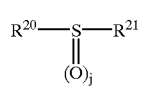
Formula [S-9]

wherein: in the formula [S-1], $R^1$, $R^2$ and $R^3$ each independently represents one of an aliphatic group and an aryl group, and a, b and c each independently represents 0 or 1;

in the formula [S-2], $R^4$ and $R^5$ each independently represents one of an aliphatic group and an aryl group, $R^6$ represents one of a fluorine atom, chlorine atom, bromine atom, iodine atom, alkyl group, alkoxy group, aryloxy group, alkoxycarbonyl group and aryloxycarbonyl group, d represents an integer from 0 to 3, and, in a case where d is more than 1, one $R^6$ may be different from another $R^6$;

in the formula [S-3], Ar represents an aryl group, e represents an integer from 1 to 6, and $R^7$ represents one of an e-valent hydrocarbon group and a hydrocarbon group that is mutually bonded by an ether bond;

in the formula [S-4], $R^8$ represents an aliphatic group, f represents an integer from 1 to 6, and $R^9$ represents one of an f-valent hydrocarbon group and a hydrocarbon group that is mutually bonded by an ether bond;

in the formula [S-5], g represents an integer from 2 to 6, $R^{10}$ represents a g-valent hydrocarbon group other than an aryl group, and $R^{11}$ represents one of an aliphatic group and an aryl group;

in the formula [S-6], $R^{12}$, $R^{13}$ and $R^{14}$ each independently represents one of a hydrogen atom, aliphatic group and aryl group, X represents one of —CO— and —SO$_2$—, and one of a pair $R^{12}$ and $R^{13}$ and a pair $R^{13}$ and $R^{14}$ may bond together mutually to form a ring;

in the formula [S-7], $R^{15}$ represents one of an aliphatic group, alkoxycarbonyl group, aryloxycarbonyl group, alkylsulfonyl group, arylsulfonyl group, aryl group and cyano group, $R^{16}$ represents one of a fluorine atom, chlorine atom, bromine atom, iodine atom, aliphatic group, aryl group, alkoxy group and aryloxy group, h represents an integer from 0 to 3, and in a case where h is more than 1, one $R^{16}$ may be different from another $R^{16}$;

in the formula [S-8], $R^{17}$ and $R^{18}$ each independently represents one of an aliphatic group and an aryl group, $R^{19}$ represents one of a fluorine atom, chlorine atom, bromine atom, iodine atom, aliphatic group, aryl group, alkoxy group and aryloxy group, i represents an integer from 0 to 4, and, in a case where i is more than 1, one $R^{19}$ may be different from another $R^{19}$;

in the formula [S-9], $R^{20}$ and $R^{21}$ each independently represents an aliphatic group or aryl group, and j represents 1 or 2.

7. A method of manufacturing an ink-jet ink, comprising dissolving an oil-soluble dye in a high boiling point organic solvent which has a boiling point of 150° C. or more and has a specific inductive capacity at 25° C. of 3 to 12, and wherein a high-pressure emulsifying and dispersing device emulsifies and disperses said oil-soluble dye at a at a pressure of 50 MPa or more.

8. A method of manufacturing an ink-jet ink, comprising dissolving an oil-soluble dye in a high boiling point organic solvent which has a boiling point of 150° C. or more and has a specific inductive capacity at 25° C. of 3 to 12, and wherein a high-pressure emulsifying and dispersing device emulsifies and disperses said oil-soluble dye at a pressure of 50 MPa or more, wherein a low boiling point organic solvent having a boiling point of 150° C. or less is added to a dye dispersed product before the emulsification and dispersion, and the low boiling point organic solvent is substantially removed from the dye dispersed product after the emulsification and dispersion.

9. A method of manufacturing an ink-jet ink according to claim 8, wherein said low boiling point organic solvent is at least one low boiling point organic solvent selected from the group consisting of esters, alcohols, ketones, amides, and ethers.

10. A method of manufacturing an ink-jet ink, comprising dissolving an oil-soluble dye in a high boiling point organic solvent which has a boiling point of 150° C. or more and has a specific inductive capacity at 25° C. of 3 to 12, and wherein a high-pressure emulsifying and dispersing device emulsifies and disperses said oil-soluble dye at a pressure of 50 MPa or more, wherein said oil-soluble dye is an oil-soluble dye which is represented in the following formula (I):

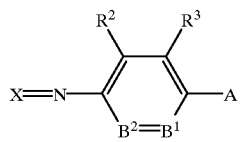
Formula (I)

wherein, X represents the residue of a color coupler;
A represents one of —NR$^4$R$^5$ and a hydroxyl group;
$R^4$ and $R^5$ represent respectively independently one of a hydrogen atom, an aliphatic group, an aromatic group, and a heterocyclic group;
$B^1$ represents one of =C(R$^6$)— and =N—;
$B^2$ represents one of —C(R$^7$)= and —N=;
$R^2$, $R^3$, $R^6$, and $R^7$ represent respectively independently one of a hydrogen atom, a halogen atom, an aliphatic group, an aromatic group, a heterocyclic group, a cyano group, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$, and —$NR^{70}SO_2R^{71}$; and $R^{51}, R^{52}, R^{53}, R^{54}, R^{55}, R^{56}, R^{57}, R^{58}, R^{59}, R^{60}, R^{61}, R^{62}, R^{63}, R^{64}, R^{65}, R^{66}, R^{67}, R^{68}, R^{69}, R^{70}$, and $R^{71}$ represent respectively independently one of a hydrogen atom, an aliphatic group, and an aromatic group.

11. A method of manufacturing an ink-jet ink according to claim 10, wherein said oil-soluble dye which is represented in the formula (I) is an oil-soluble dye which is represented in the following formula (II):

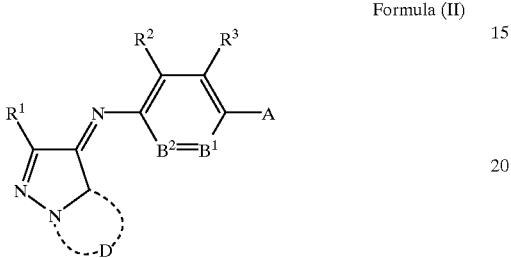

Formula (II)

wherein, $R^2, R^3, A, B^1$, and $B^2$ are synonymous with $R^2, R^3, A, B^1$, and $B^2$ in the formula (I);

$R^1$ represents one of a hydrogen atom, an aliphatic group, an aromatic group, a heterocyclic group, a cyano group, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}CO_2R^{26}$, —$COR^{27}$, —$NR^{28}COR^{29}$, and —$NR^{30}SO_2R^{31}$;

$R^{11}, R^{12}, R^{13}, R^{14}, R^{15}, R^{16}, R^{17}, R^{18}, R^{19}, R^{20}, R^{21}, R^{22}, R^{23}, R^{24}, R^{25}, R^{26}, R^{27}, R^{28}, R^{29}, R^{30}$, and $R^{31}$ represent respectively independently one of a hydrogen atom, an aliphatic group, and an aromatic group;

D represents an atom group which forms one of a five-membered nitrogen-containing heterocyclic ring and a six-membered nitrogen-containing heterocyclic ring which may be substituted for at least one of an aliphatic group, an aromatic group, a heterocyclic group, a cyano group, —$OR^{81}$, —$SR^{82}$, —$CO_2R^{83}$, —$OCOR^{84}$, —$NR^{85}R^{86}$, —$CONR^{87}R^{88}$, —$SO_2R^{89}$, —$SO_2NR^{90}R^{91}$, —$NR^{92}CONR^{93}R^{94}$, —$NR^{95}CO_2R^{96}$, —$COR^{97}$, —$NR^{98}COR^{99}$, and —$NR^{100}SO_2R^{101}$; and $R^{81}, R^{82}, R^{83}, R^{84}, R^{85}, R^{86}, R^{87}, R^{88}, R^{89}, R^{90}, R^{91}, R^{92}, R^{93}, R^{94}, R^{95}, R^{96}, R^{97}, R^{98}, R^{99}, R^{100}$, and $R^{101}$ represent respectively independently one of a hydrogen atom, an aliphatic group, and an aromatic group.

12. A method of manufacturing an ink-jet ink according to claim 11, wherein said oil-soluble dye which is represented in the formula (II) is an oil-soluble dye which is represented in the following formula (III):

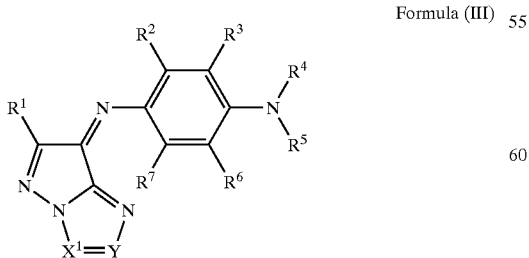

Formula (III)

wherein, $R^1, R^2, R^3, R^4, R^5, R^6$, and $R^7$ are synonymous with $R^1, R^2, R^3, R^4, R^5, R^6$, and $R^7$ in the formula (II);

$X^1$ and Y represent respectively independently one of —$C(R^8)$= and —N=;

$R^8$ represents one of a hydrogen atom, an aliphatic group, and an aromatic group; and one of $X^1$ and Y is always —N=, and $X^1$ and Y are —N= at different times.

13. A method of manufacturing an ink-jet ink according to claim 10, wherein said oil-soluble dye which is represented in the formula (I) is at least one of oil-soluble dyes which are represented in the following formulae (IV-1) to (IV-4):

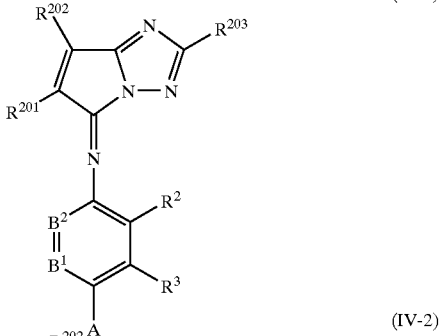

(IV-1)

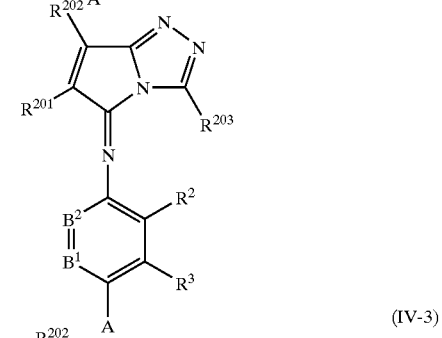

(IV-2)

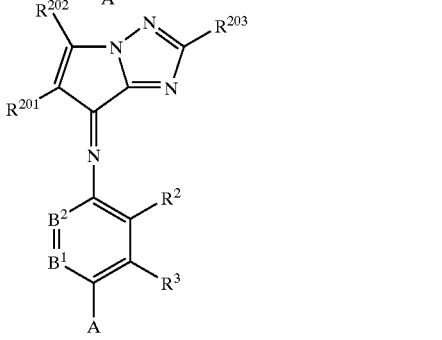

(IV-3)

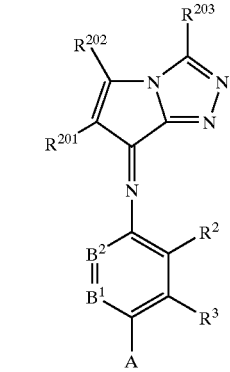

(IV-4)

wherein, A, $R^2, R^3, B^1$, and $B^2$ are synonymous with A, $R^2, R^3, B^1$, and $B^2$ in the above formula (I);

$R^{201}, R^{202}$, and $R^{203}$ represent respectively independently one of a hydrogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, and $-NR^{30}SO_2R^{31}$;

$R^{11}, R^{12}, R^{13}, R^{14}, R^{15}, R^{16}, R^{17}, R^{18}, R^{19}, R^{20}, R^{21}, R^{22}, R^{23}, R^{24}, R^{25}, R^{26}, R^{27}, R^{28}, R^{29}, R^{30}$, and $R^{31}$ represent respectively independently one of a hydrogen atom, an aliphatic group, and an aromatic group; and $R^{201}$ and $R^{202}$ may be combined with each other and form a ring structure.

14. A method of manufacturing an ink-jet ink, comprising dissolving an oil-soluble dye in a high boiling point organic solvent which has a boiling point of 150° C. or more and has a specific inductive capacity at 25° C. of 3 to 12, and wherein a high-pressure emulsifying and dispersing device emulsifies and disperses said oil-soluble dye at a pressure of 50 MPa or more, wherein said high boiling point organic solvent is at least one of high boiling point organic solvents which are represented in the following formulae [S-1] to [S-9]:

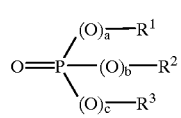

Formula [S-1]

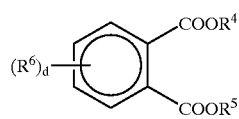

Formula [S-2]

Formula [S-3]

Formula [S-4]

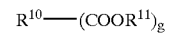

Formula [S-5]

Formula [S-6]

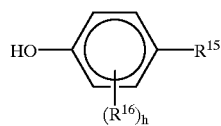

Formula [S-7]

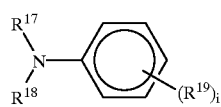

Formula [S-8]

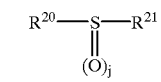

Formula [S-9]

wherein: in the formula [S-1], $R^1$, $R^2$ and $R^3$ each independently represents one of an aliphatic group and an aryl group, and a, b and c each independently represents 0 or 1;

in the formula [S-2], $R^4$ and $R^5$ each independently represents one of an aliphatic group and an aryl group, $R^6$ represents one of a fluorine atom, chlorine atom, bromine atom, iodine atom, alkyl group, alkoxy group, aryloxy group, alkoxycarbonyl group and aryloxycarbonyl group, d represents an integer from 0 to 3, and, in a case where d is more than 1, one $R^6$ may be different from another $R^6$;

in the formula [S-3], Ar represents an aryl group, e represents an integer from 1 to 6, and $R^7$ represents one of an e-valent hydrocarbon group and a hydrocarbon group that is mutually bonded by an ether bond;

in the formula [S-4], $R^8$ represents an aliphatic group, f represents an integer from 1 to 6, and $R^9$ represents one of an f-valent hydrocarbon group and a hydrocarbon group that is mutually bonded by an ether bond;

in the formula [S-5], g represents an integer from 2 to 6, $R^{10}$ represents a g-valent hydrocarbon group other than an aryl group, and $R^{11}$ represents one of an aliphatic group and an aryl group;

in the formula [S-6], $R^{12}$, $R^{13}$ and $R^{14}$ each independently represents one of a hydrogen atom, aliphatic group and aryl group, X represents one of $-CO-$ and $-SO_2-$, and one of a pair $R^{12}$ and $R^{13}$ and a pair $R^{13}$ and $R^{14}$ may bond together mutually to form a ring;

in the formula [S-7], $R^{15}$ represents one of an aliphatic group, alkoxycarbonyl group, aryloxycarbonyl group, alkylsulfonyl group, arylsulfonyl group, aryl group and cyano group, $R^{16}$ represents one of a fluorine atom, chlorine atom, bromine atom, iodine atom, aliphatic group, aryl group, alkoxy group and aryloxy group, h represents an integer from 0 to 3, and in a case where h is more than 1, one $R^{16}$ may be different from another $R^{16}$;

in the formula [S-8], $R^{17}$ and $R^{18}$ each independently represents one of an aliphatic group and an aryl group, $R^{19}$ represents one of a fluorine atom, chlorine atom, bromine atom, iodine atom, aliphatic group, aryl group, alkoxy group and aryloxy group, i represents an integer from 0 to 4, and, in a case where i is more than 1, one $R^{19}$ may be different from another $R^{19}$;

in the formula [S-9], $R^{20}$ and $R^{21}$ each independently represents an aliphatic group or aryl group, and j represents 1 or 2.

15. An ink jet recording method comprising recording an ink-jet ink onto an image receiving material, wherein the ink-jet ink includes a dye dispersed product, an oil soluble dye being dissolved in a high boiling point organic solvent which has a boiling point of 150° C. or more and has a specific inductive capacity at 25° C. of 3 to 12, said oil-soluble dye being emulsified and dispersed in a water-based medium, and said dye dispersed product being formed, wherein the volume average particle size of dispersed particles in said dye dispersed product is from 1 to 100 nm.

16. An ink jet recording method comprising recording an ink-jet ink onto an image receiving material, wherein the ink-jet ink includes a dye dispersed product, an oil soluble dye being dissolved in a high boiling point organic solvent which has a boiling point of 150° C. or more and has a specific inductive capacity at 25° C. of 3 to 12, said oil-soluble dye being emulsified and dispersed in a water-based medium, and said dye dispersed product being formed, wherein the image receiving material has an image receiving layer which includes a white pigment.

* * * * *